(12) United States Patent
Fukai et al.

(10) Patent No.: US 12,445,722 B2
(45) Date of Patent: Oct. 14, 2025

(54) LENS APPARATUS AND IMAGE PICKUP APPARATUS CAPABLE OF SWITCHING BETWEEN DRIVING MODES

(71) Applicant: CANON KABUSHIKI KAISHA, Tokyo (JP)

(72) Inventors: Yosuke Fukai, Kanagawa (JP); Taro Murakami, Tokyo (JP); Kiyoshi Nitto, Saitama (JP); Yusuke Fujiwara, Tokyo (JP); Junichiro Iwamatsu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 148 days.

(21) Appl. No.: 18/474,746

(22) Filed: Sep. 26, 2023

(65) Prior Publication Data

US 2024/0114241 A1 Apr. 4, 2024

(30) Foreign Application Priority Data

Sep. 30, 2022 (JP) .................................. 2022-157346
May 31, 2023 (JP) .................................. 2023-090563

(51) Int. Cl.
*H04N 23/67* (2023.01)
*H04N 23/54* (2023.01)
(Continued)

(52) U.S. Cl.
CPC ............. *H04N 23/67* (2023.01); *H04N 23/54* (2023.01); *H04N 23/55* (2023.01); *H04N 23/667* (2023.01)

(58) Field of Classification Search
CPC ........ H04N 23/67; H04N 23/54; H04N 23/55; H04N 23/667; G02B 7/282; G02B 7/14; G03B 13/12; G03B 13/16
See application file for complete search history.

(56) References Cited

U.S. PATENT DOCUMENTS

| 6,862,140 B2 * | 3/2005 | Ogino ................. H04N 13/211 359/473 |
| 2011/0018972 A1 * | 1/2011 | Pan ...................... H04N 13/296 348/47 |

(Continued)

FOREIGN PATENT DOCUMENTS

| CN | 112526817 A | * | 3/2021 | ............. G02B 15/14 |
| JP | H10142477 A | | 5/1998 | |

(Continued)

OTHER PUBLICATIONS

British Search Report issued on Mar. 11, 2024, that issued in the corresponding British Patent Application No. GB2314935.4.

*Primary Examiner* — Padma Haliyur
(74) *Attorney, Agent, or Firm* — Cowan, Liebowitz & Latman, P.C.

(57) ABSTRACT

A lens apparatus attachable to an image pickup apparatus includes a first optical system, a second optical system, and a driving unit that moves at least one of the first optical system and the second optical system in an optical axis direction. The lens apparatus is configured to switch between a first driving mode for performing autofocus by moving both the first optical system and the second optical system in optical axis directions of the first optical system and the second optical system via the driving unit, and a second driving mode for adjusting a difference in imaging position for a same object image between the first optical system and the second optical system by moving the at least one of the first optical system and the second optical system in the optical axis direction via the driving unit.

19 Claims, 29 Drawing Sheets

(51) Int. Cl.
*H04N 23/55* (2023.01)
*H04N 23/667* (2023.01)

(56) References Cited

U.S. PATENT DOCUMENTS

| | | | |
|---|---|---|---|
| 2012/0051732 A1* | 3/2012 | Aoki | G03B 35/10 |
| | | | 396/374 |
| 2013/0162784 A1* | 6/2013 | Ueda | H04N 13/296 |
| | | | 348/E5.045 |
| 2014/0168383 A1* | 6/2014 | Murakami | H04N 13/296 |
| | | | 348/47 |
| 2018/0259739 A1 | 9/2018 | Ooya | |
| 2021/0088893 A1* | 3/2021 | Murakami | H04N 13/218 |
| 2021/0243373 A1* | 8/2021 | Toyoda | H04N 23/675 |
| 2022/0400208 A1 | 12/2022 | Takao | |
| 2023/0418147 A1* | 12/2023 | Murakami | H04N 23/698 |

FOREIGN PATENT DOCUMENTS

| | | | |
|---|---|---|---|
| JP | 4602039 B2 | 12/2010 | |
| JP | 2015041935 A | 3/2015 | |

\* cited by examiner

LENS APPARATUS AND IMAGE PICKUP APPARATUS CAPABLE OF SWITCHING BETWEEN DRIVING MODES

BACKGROUND

Technical Field

One of the aspects of the embodiments relates to a lens apparatus and an image pickup apparatus.

Description of Related Art

A lens apparatus has conventionally been known in which left and right optical systems are arranged and spaced from each other by a predetermined distance (base length), and two image circles are imaged in parallel on a single image sensor. For this lens apparatus, images formed by the left and right optical systems are recorded as moving (motion) or still images for the left eye and the right eye, respectively, and are viewed using a three-dimensional display, VR goggles, etc. during playback so that the right eye of the viewer views the right-eye image and the left eye of the viewer views the left-eye image. At this time, images with parallax are projected to the right and left eyes due to the base length between the pair of left and right optical systems, so the viewer can acquire a stereoscopic effect. In order to capture images with parallax, focusing of each of the left and right optical systems is necessary.

Japanese Patent No. 4602039 discloses a configuration of binoculars with an imaging function, which is different from the above configuration, which can switch between a rough adjustment mode using rotation operation of a focus dial and a fine adjustment mode using pressing of a release button.

The configuration of Japanese Patent No. 4602039 simultaneously adjusts the left and right optical systems, but cannot eliminate a focus difference between left and right images, and gives an uncomfortable impression to a viewer.

SUMMARY

A lens apparatus according to one aspect of the embodiment is configured to be attachable to and detachable from an image pickup apparatus. The lens apparatus includes a first optical system and a second optical system, and a driving unit configured to move at least one of the first optical system and the second optical system in an optical axis direction of the at least one of the first optical system and the second optical system. The lens apparatus is configured to switch between a first driving mode for performing autofocus by moving both the first optical system and the second optical system in the optical axis directions of the first optical system and the second optical system via the driving unit, and a second driving mode for adjusting a difference in imaging position for a same object image between the first optical system and the second optical system by moving the at least one of the first optical system and the second optical system in the optical axis direction of the at least one of the first optical system and the second optical system via the driving unit. An image pickup apparatus including the above lens apparatus also constitutes another aspect of the embodiment.

Further features of the disclosure will become apparent from the following description of embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

DESCRIPTION OF THE EMBODIMENTS

Figure 1:
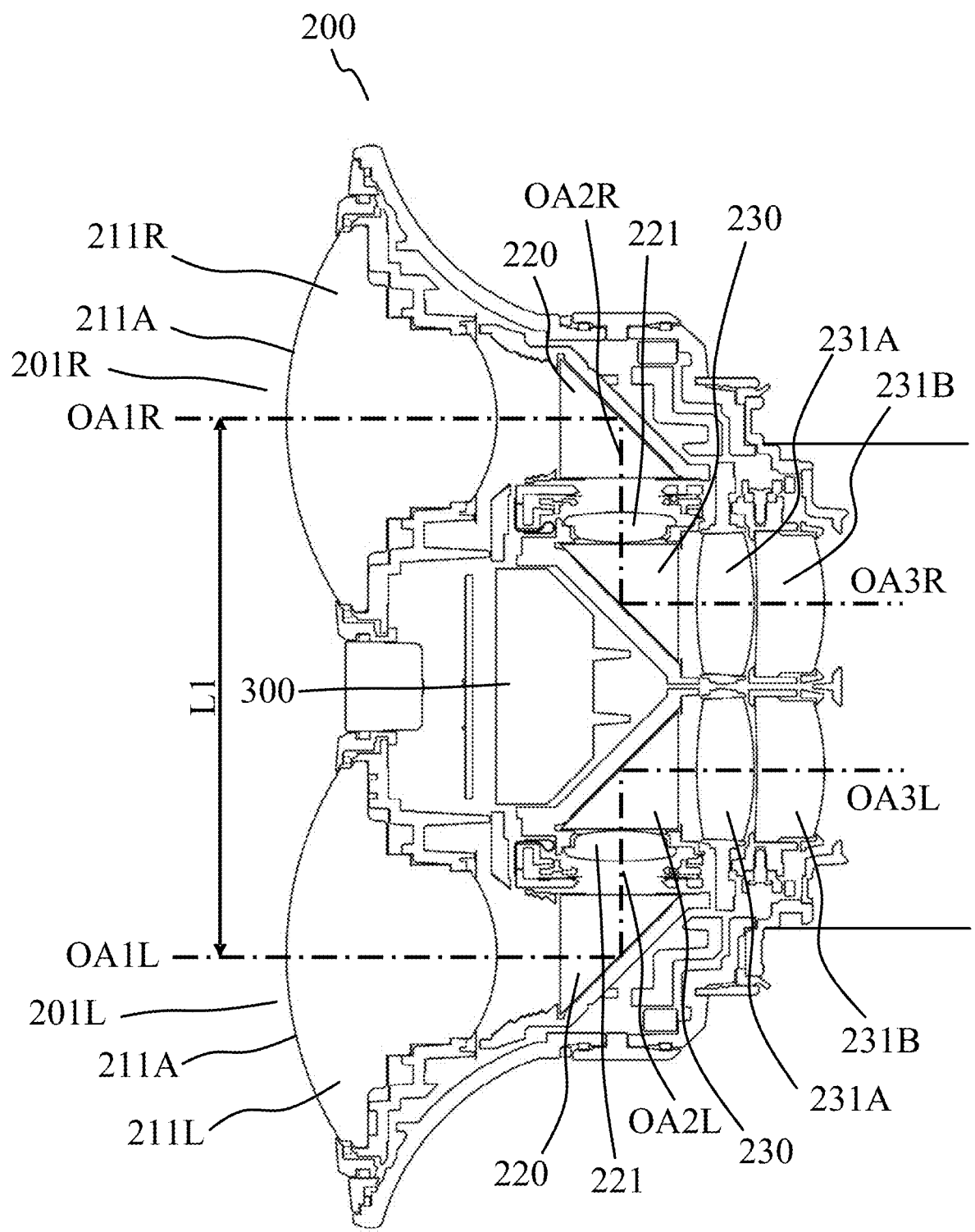
FIG. 1 is a sectional view of an interchangeable lens according to Example 1.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem.

Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted. Each of the embodiments of the present invention described below can be implemented solely or as a combination of a plurality of the embodiments or features thereof where necessary or where the combination of elements or features from individual embodiments in a single embodiment is beneficial.

A lens apparatus (interchangeable lens) according to one embodiment includes two optical systems (first optical system and second optical system) arranged in parallel (symmetrically), and is configured to image two image circles in parallel on a single image sensor. These two optical systems are horizontally arranged, and separated by a predetermined distance (base length). Viewed from the image side, an image formed by the right optical system (first optical system) is recorded as a moving or still image for the right eye, and an image formed by the left optical system (second optical system) is recorded as a moving image or still image for the left eye.

By viewing a moving or a still image (video) using a three-dimensional display, so-called VR goggles, or the like, the viewer's right eye views the right-eye image, and his left eye sees the left-eye image. At this time, images with parallax are projected to the right and left eyes due to the base length between the left and right optical systems, so the viewer can acquire a three-dimensional effect. Thus, the lens apparatus according to this embodiment is a lens apparatus for stereoscopic imaging that can form two images with parallax by the first optical system and the second optical system.

In the following description, descriptions of the first optical system (right-eye optical system) will be appended with R, and descriptions of the second optical system (left-eye optical system) will be appended with L. Descriptions that are common to both the right-eye optical system and the left-eye optical system do not have the R or L suffix.

Example 1

Figure 2:
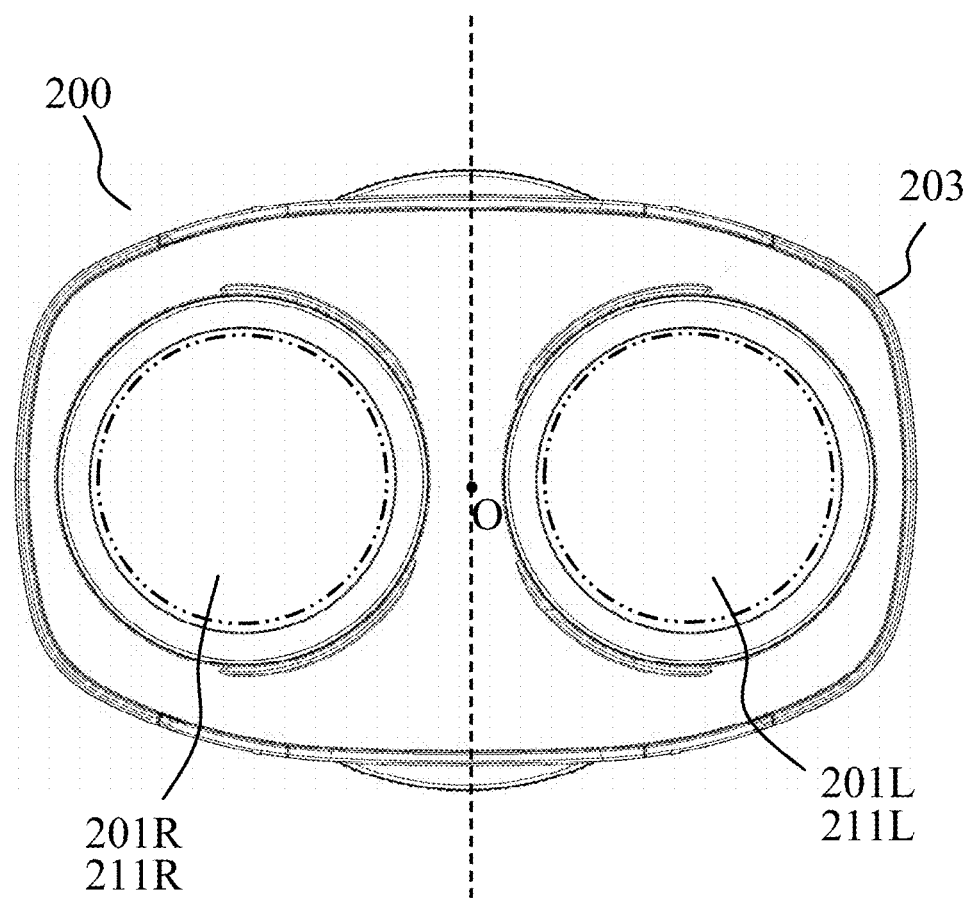
FIG. 2 is a front view of the interchangeable lens according to Example 1.

FIG. 1 is a sectional view of the interchangeable lens 200 according to this example. FIG. 2 is a front view of the interchangeable lens 200.

The interchangeable lens 200 includes a right-eye optical system 201R and a left-eye optical system 201L. The right-eye optical system 201R and the left-eye optical system 201L are each capable of imaging with an angle of view of 180 degrees or more. Each of the left-eye and right-eye optical systems has, in order from the object side, a first optical axis OA1, a second optical axis OA2 substantially orthogonal to the first optical axis OA1, and a third optical axis OA3 parallel to the first optical axis OA1. Each of the right-eye and left-eye optical systems includes a first lens (unit) 211 having a convex surface 211A on the object side disposed along the first optical axis OA1, a second lens (unit) 221 disposed along the second optical axis OA2, third lenses (lens units) 231A and 231B disposed along the third optical axis OA3. Each of the right-eye and left-eye optical systems further includes a first prism 220 that bends a light beam parallel to the first optical axis OA1 and guides it to the second optical axis OA2, and a second prism 230 that bends a light beam parallel to the second optical axis OA2 and guides it to the third optical axis OA3. In the following description, the optical axis direction is a direction parallel to the first optical axis OA1, which is a direction extending to the object side and the imaging surface side. Although the optical systems are disposed on the left and right sides in this example, they may be disposed on the upper and lower sides.

Figure 3:
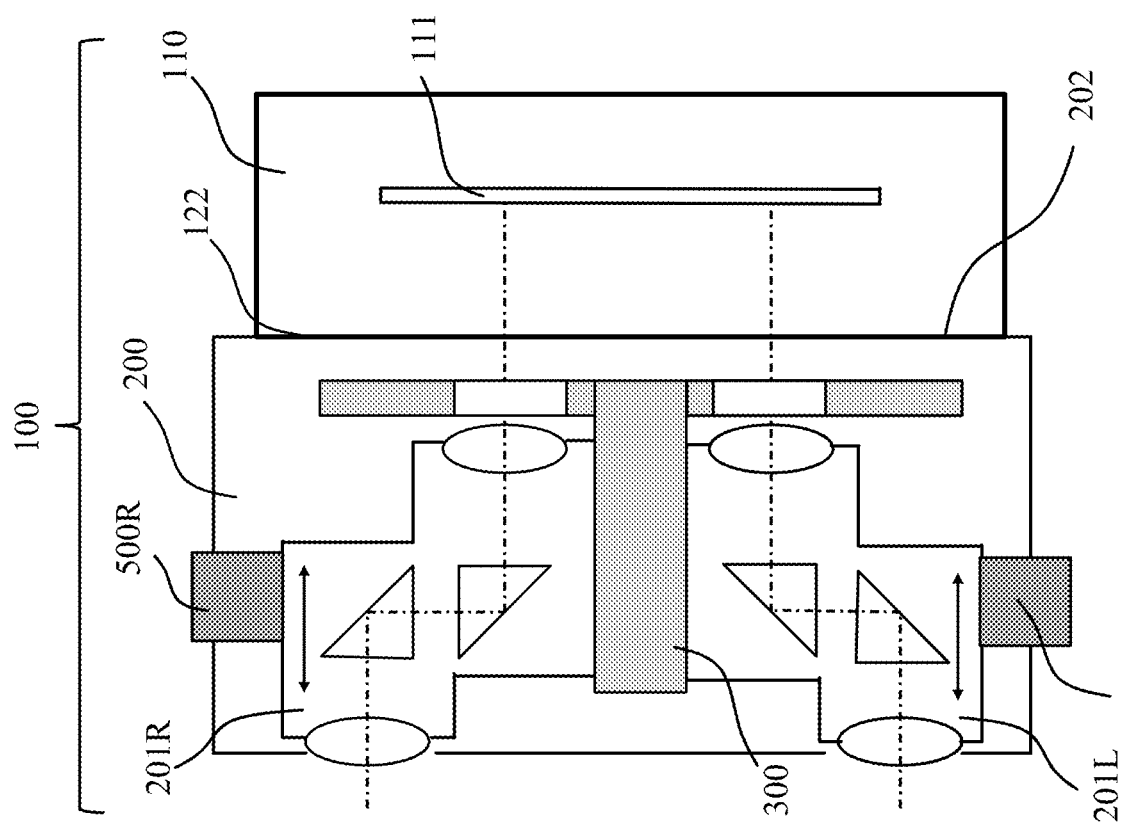
FIG. 3 is a schematic configuration diagram of each of camera systems according to Examples 1 to 3.

FIG. 3 is a schematic configuration diagram of a camera system 100 according to this example. The camera system 100 includes the interchangeable lens 200 and a camera body (image pickup apparatus) 110 to which the interchangeable lens 200 is detachably attached. The camera body 110 includes a single image sensor 111.

In this example, the left-eye and right-eye optical systems are supported by the lens base 300 so as to be movable relative to the lens base 300 in a direction orthogonal to the imaging surface of the image sensor 111. A right-eye driving unit (first adjusting unit) 500R and a left-eye driving unit (second adjusting unit) 500L for moving relative to the lens base 300 are attached to the right-eye and left-eye optical systems, respectively. The right-eye driving unit 500R moves the right-eye optical system 201R for focusing of the right-eye optical system 201. The left-eye driving unit 500L moves the left-eye optical system 201L for focusing of the left-eye optical system 201L. Due to this configuration, the left-eye and right-eye optical systems can move relative to each other in the direction orthogonal to the imaging surface of the image sensor 111. The left-eye and right-eye optical systems can perform focusing by moving the entire optical system via the right-eye driving unit 500R and the left-eye driving unit 500L, respectively. This example uses a DC motor or a stepping motor as a driving source, but may use another driving source.

The interchangeable lens 200 is attached to the camera body 110 via a lens mount unit 202 and a camera mount unit 122. The image sensor 111 is installed so that its imaging surface is parallel to the lens mount unit 202. However, it is difficult to make the imaging surface perfectly parallel to the lens mount unit 202 due to manufacturing errors, and the image sensor 111 is actually fixed with the imaging surface slightly tilted relative to the lens mount unit 202.

Figure 4:
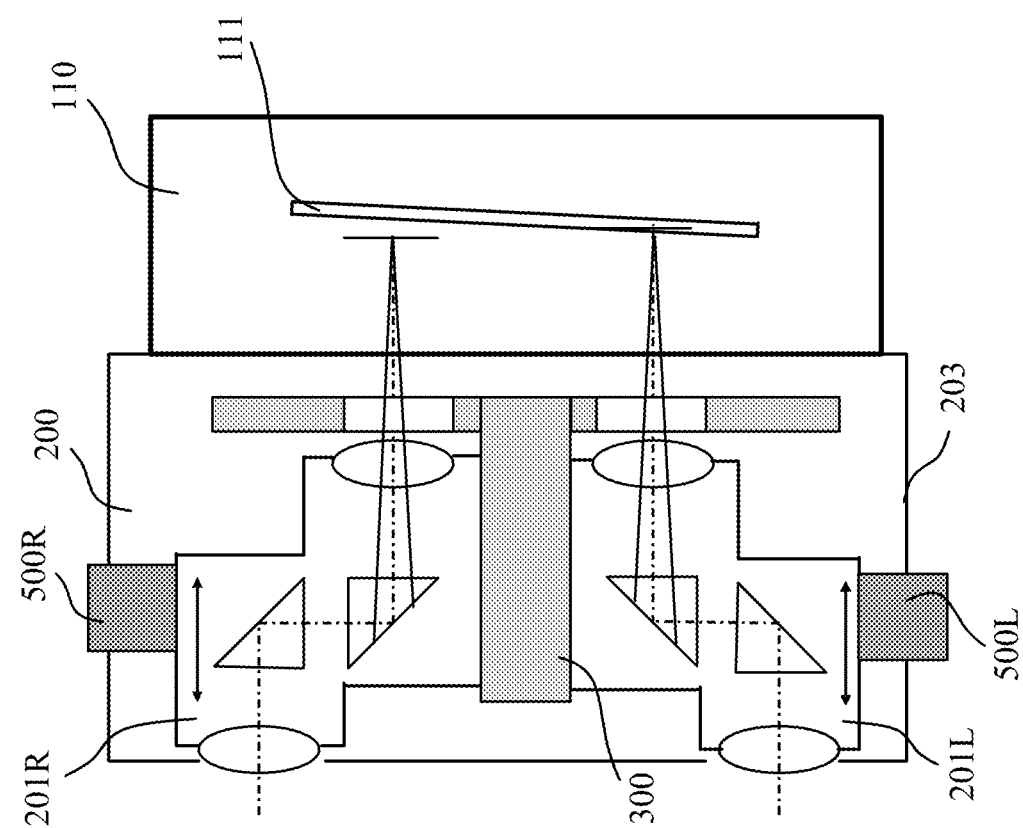
FIG. 4 is a schematic configuration diagram illustrating a tilted image sensor.

FIG. 4 is a schematic configuration diagram illustrating the tilted image sensor 111. The manufacturing process adjusts the interchangeable lens 200 so that a distance between an imaging position of the right-eye optical system 201R and an imaging position of the left-eye optical system 201L from the lens mount unit 202, that is, a difference between the so-called flange back distances becomes 0. However, due to the tilt of the image sensor 111, the right-eye and left-eye optical systems do not always have the best in-focus position. Accordingly, this example configures the right-eye and left-eye optical systems movable in the direction orthogonal to the imaging surface, and thereby adjusts the focus positions of the right-eye and left-eye optical systems.

Figure 5:
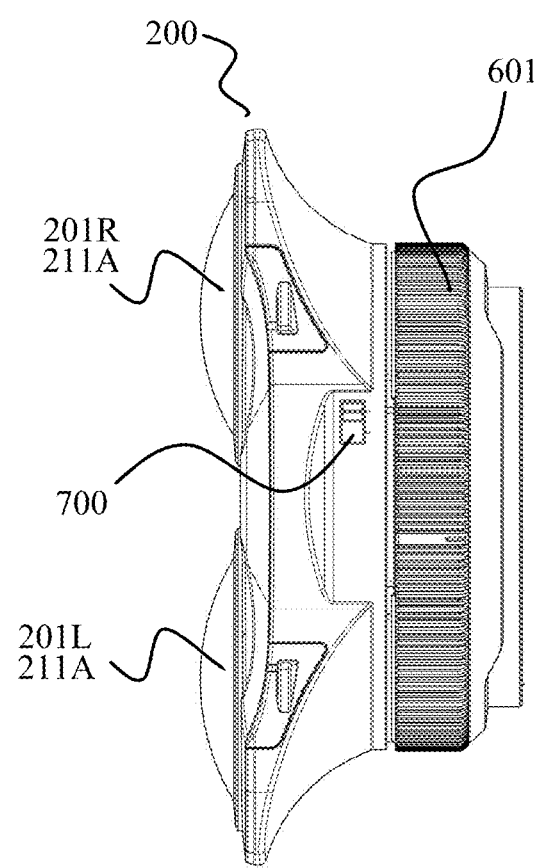
FIG. 5 is a top view of the interchangeable lens according to Example 1.

FIG. 5 is a top view of the interchangeable lens 200. The left-eye and right-eye optical systems are disposed so as to protrude from the interchangeable lens 200. The interchangeable lens 200 includes a manual focus operation ring (referred to as an MF operation ring hereinafter) 601 and an AF/MF switch 700. The interchangeable lens 200 is switchable between an autofocus mode (AF mode) and a manual focus mode (MF mode) by the AF/MF switch 700.

The AF mode performs focusing of the left-eye and right-eye optical systems based on object information. The MF mode performs focusing of the left-eye and right-eye optical systems based on the operation on the MF operation ring 601, which is an operation member. More specifically, in a case where the photographer rotates the MF operation ring 601 while the AF/MF switch 700 is set to "MF," the left-eye and right-eye optical systems move in the optical axis direction. The AF mode and the MF mode are switched by the AF/MF switch 700 in this example, but may be switched from the menu screen of the camera body 110.

Figure 6:
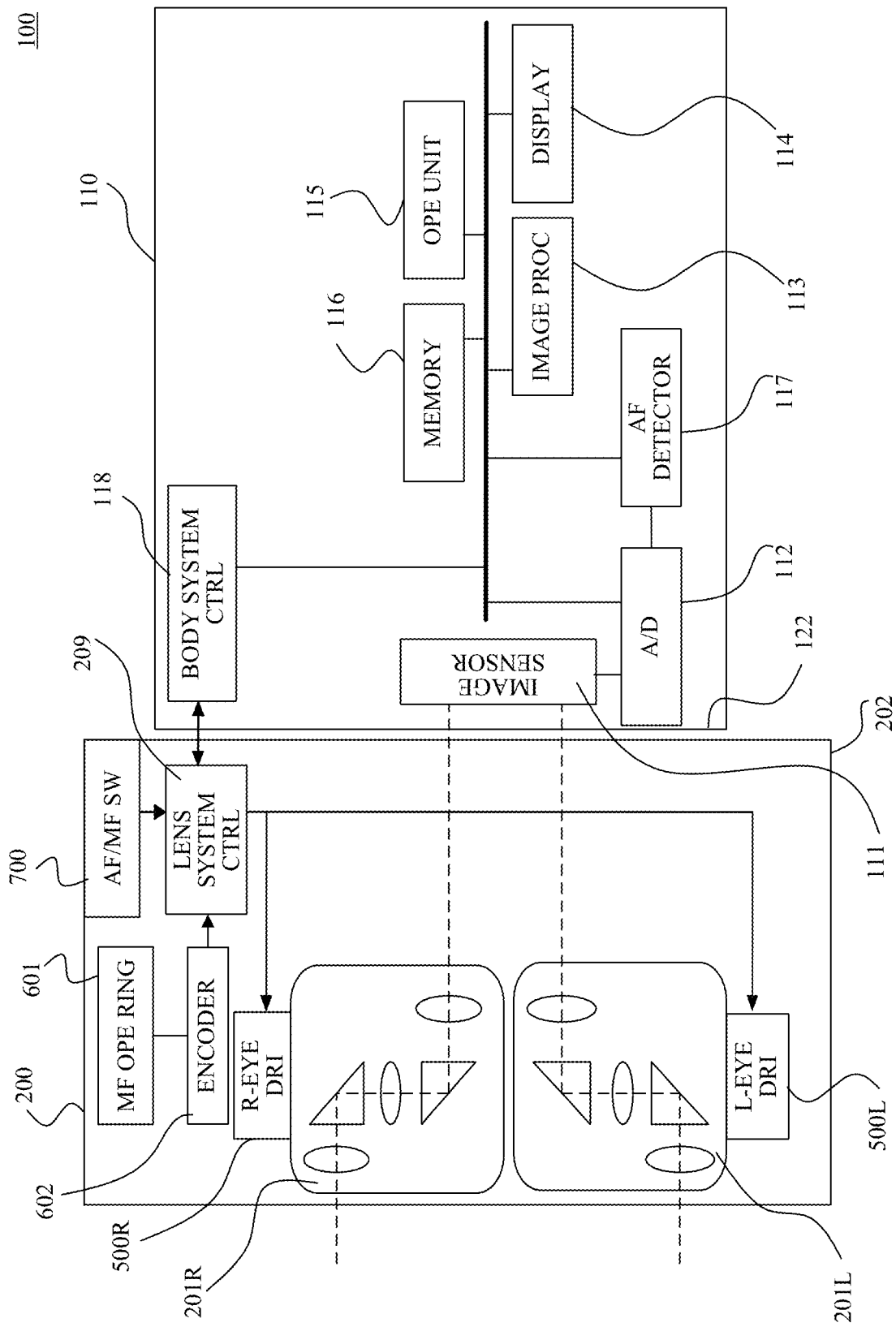
FIG. 6 is an electrical block diagram of the camera system according to Example 1.

FIG. 6 is an electrical block diagram of the camera system 100. The interchangeable lens 200 includes the right-eye optical system 201R, the left-eye optical system 201L, the lens mount unit 202, the right-eye driving unit 500R, the left-eye driving unit 500L, the MF operation ring 601, an encoder 602, the AF/MF switch 700, and a lens system control unit 209. The camera body 110 includes the image sensor 111, an A/D converter 112, an image processing unit 113, a display unit 114, an operation unit 115, a memory 116, an AF detector 117, a body system control unit 118, and the camera mount unit 122.

In a case where the interchangeable lens 200 is attached to the camera body 110 via the lens mount unit 202 and the camera mount unit 122, the body system control unit 118 and the lens system control unit 209 are electrically connected.

A right-eye image formed via the right-eye optical system 201R and a left-eye image formed via the left-eye optical system 201L are formed side by side on the image sensor 111 as object images. The image sensor 111 converts formed object images (optical signals) into analog electrical signals. The A/D converter 112 converts the analog electrical signal output from the image sensor 111 into a digital electrical signal (image signal, digital signal of the object image). The A/D converter 112 may be built in the image sensor 111. The image processing unit 113 performs various image processing for the digital electrical signal output from the A/D converter 112.

The display unit 114 displays various information. The display unit 114 is realized by using an electronic viewfinder or a liquid crystal panel, for example. The operation unit 115 functions as a user interface for the photographer to give instructions to the camera system 100. In a case where the display unit 114 has a touch panel, the touch panel serves as the operation unit 115.

The memory (storage unit) 116 stores various data such as image data that have undergone image processing by the image processing unit 113. The memory 116 also stores programs. The memory 116 is realized by using ROM, RAM, and HDD, for example.

The AF detector 117 calculates driving amounts of the right-eye driving unit 500R and the left-eye driving unit 500L for the digital electric signals (image signals) output from the A/D converter 112.

The body system control unit 118 controls the camera system 100 as a whole. The body system control unit 118 is realized by using a CPU, for example.

Figure 7:
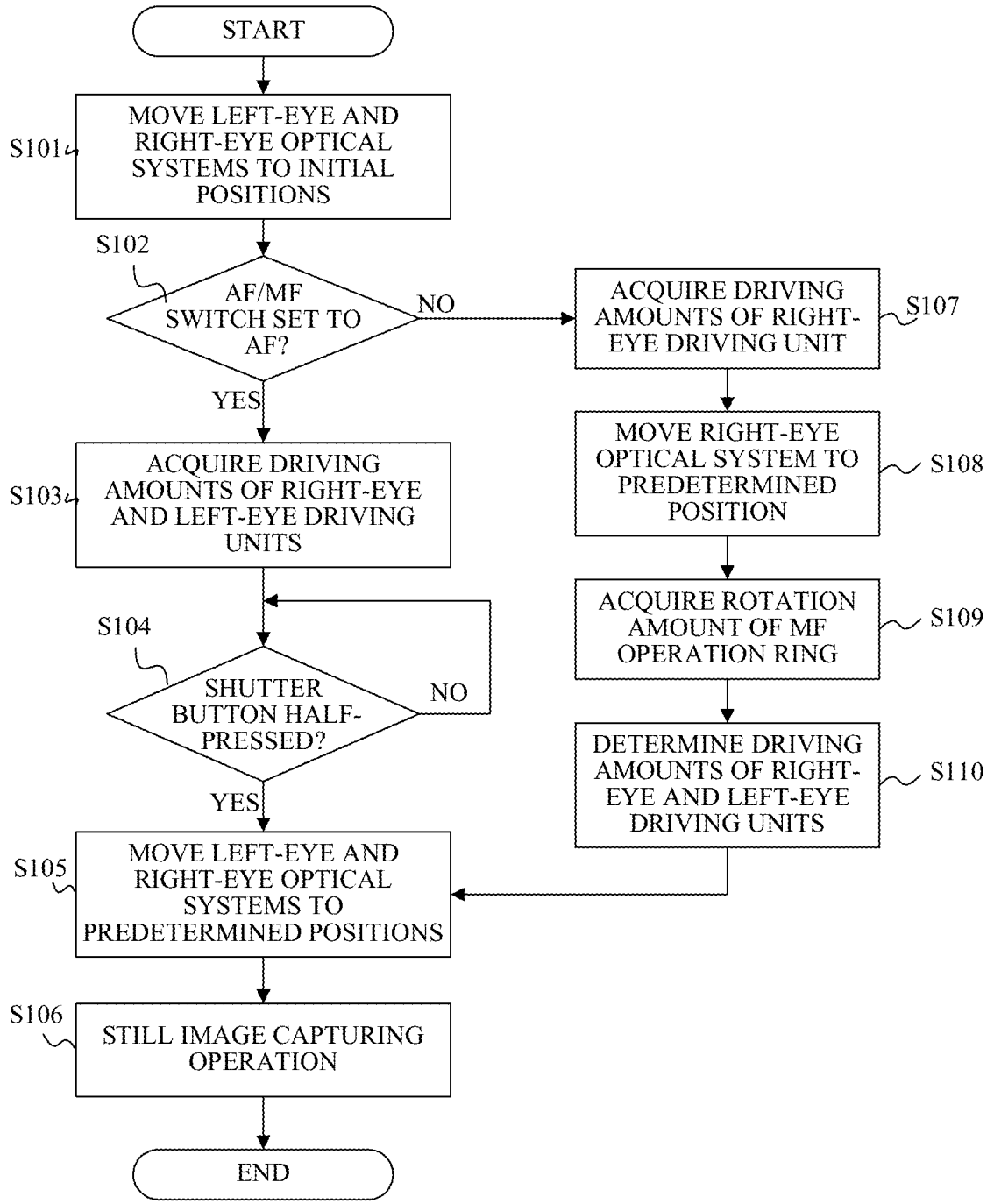
FIG. 7 is a flowchart illustrating processing in determining motion of a focus lens according to Example 1.

FIG. 7 is a flowchart illustrating processing in determining motion of the focus lens by the body system control unit 118 and the lens system control unit 209 according to this example. The flow in FIG. 7 starts when the camera system 100 is powered on.

In step S101, the lens system control unit 209 causes the right-eye driving unit 500R and the left-eye driving unit 500L to move the right-eye optical system 201R and the left-eye optical system 201L to the initial positions.

In step S102, the lens system control unit 209 determines whether the AF/MF switch 700 is set to "AF." In a case where it is determined that it is set to "AF," the processing of step S103 is executed, and in a case where it is determined that it is not set to "AF" or it is set to "MF," the processing of step S107 is executed.

In step S103, the lens system control unit 209 acquires the driving amounts of the right-eye driving unit 500R and the left-eye driving unit 500L calculated by the AF detector 117 using the AF detection results of the left and right images.

In step S104, the lens system control unit 209 determines whether or not a half-press operation of the shutter button by the photographer has been detected. In a case where it is determined that the half-press operation of the shutter button has been detected, the processing of step S105 is executed, and in a case where it is determined otherwise, the processing of step S104 is executed again.

In step S105, the lens system control unit 209 cooperatively drives the right-eye driving unit 500R and the left-eye driving unit 500L with the driving amounts acquired in step S103 or determined in step S110 described below, and the left-eye and right-eye optical systems are driven to predetermined positions.

In step S106, the lens system control unit 209 executes a still image capturing operation according to a full-pressing operation of the shutter button by the photographer.

In step S107, the lens system control unit 209 acquires the driving amount of the right-eye driving unit 500R calculated by the AF detector 117 using the focus difference between the left and right images.

In step S108, the lens system control unit 209 drives the right-eye driving unit 500R with the driving amount obtained in step S107, and moves the right-eye optical system 201R to a predetermined position. Thereby, a focus difference between the left and right images is eliminated.

In step S109, the lens system control unit 209 acquires a rotation amount (operation amount) of the MF operation ring 601 by the photographer detected by the encoder 602.

In step S110, the lens system control unit 209 determine driving amounts of the right-eye driving unit 500R and the left-eye driving unit 500L using the rotation amount of the MF operation ring 601.

The configuration according to this example enables the photographer to switch between the AF mode and the MF mode with a simple operation, and even if the left-eye and right-eye optical systems are mounted, focusing of the left-eye and right-eye optical systems can be easily performed by operating the MF operation ring 601.

This example has discussed still image capturing, but is applicable to moving image capturing. This example moves the right-eye optical system 201R to match the position of the left-eye optical system 201L using a detection result by the AF detector 117 in the MF mode, but the present disclosure is not limited to this example. That is, one of the left-eye and right-eye optical systems may be moved so as to eliminate a focus difference. In a case where there is a sufficient depth of field, a slight focus difference between left and right images does not pose a problem and thus this alignment operation may be omitted. In this example, each of the left-eye and right-eye optical systems has an overall focus mechanism capable of focusing by moving all the lenses, but may have an inner focus mechanism capable of focusing by moving a part of the lenses.

Example 2

The camera system 100 according to this example is different from the camera system 100 according to Example 1 in the configuration of the interchangeable lens 200. The configuration of the camera body 110 is similar to that of Example 1. This example will discuss configurations different from those of Example 1, and will omit descriptions of common configurations.

Figure 8:
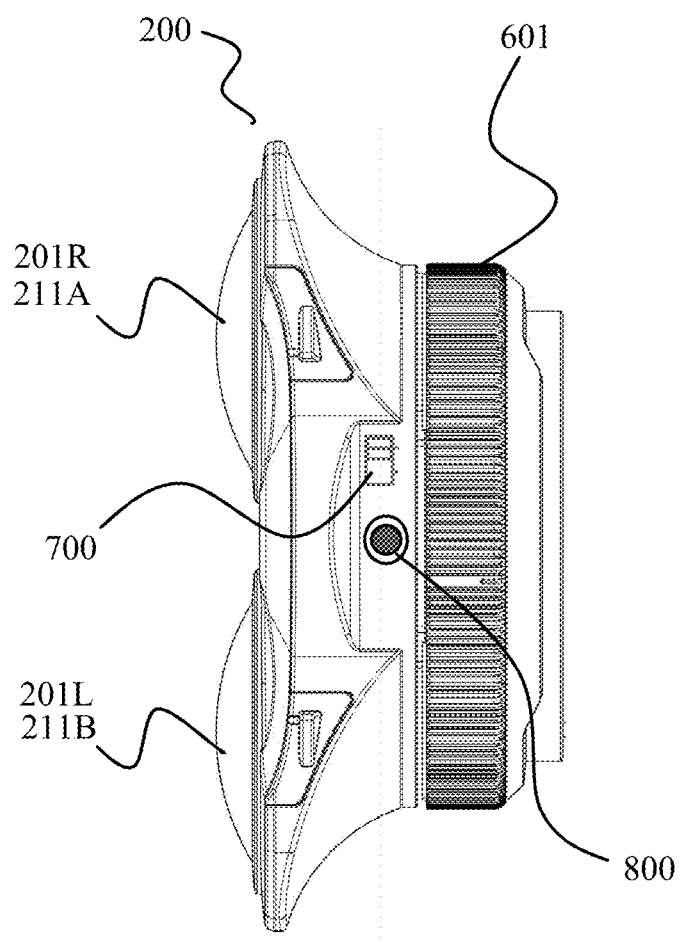
FIG. 8 is a top view of an interchangeable lens according to Example 2.

FIG. 8 is a top view of the interchangeable lens 200 according to this example. In this example, the interchangeable lens 200 has a selection button (selector) 800. In this example, the photographer can select which of the right-eye optical system 201R and left-eye optical system 201L is to be moved in a case where the MF operation ring 601 is rotated using the selection button 800. That is, in this example, the photographer can select the driving unit to be driven during MF using the selection button 800. Although the selection button 800 is a button in this example, it may be another operation member.

Figure 9:
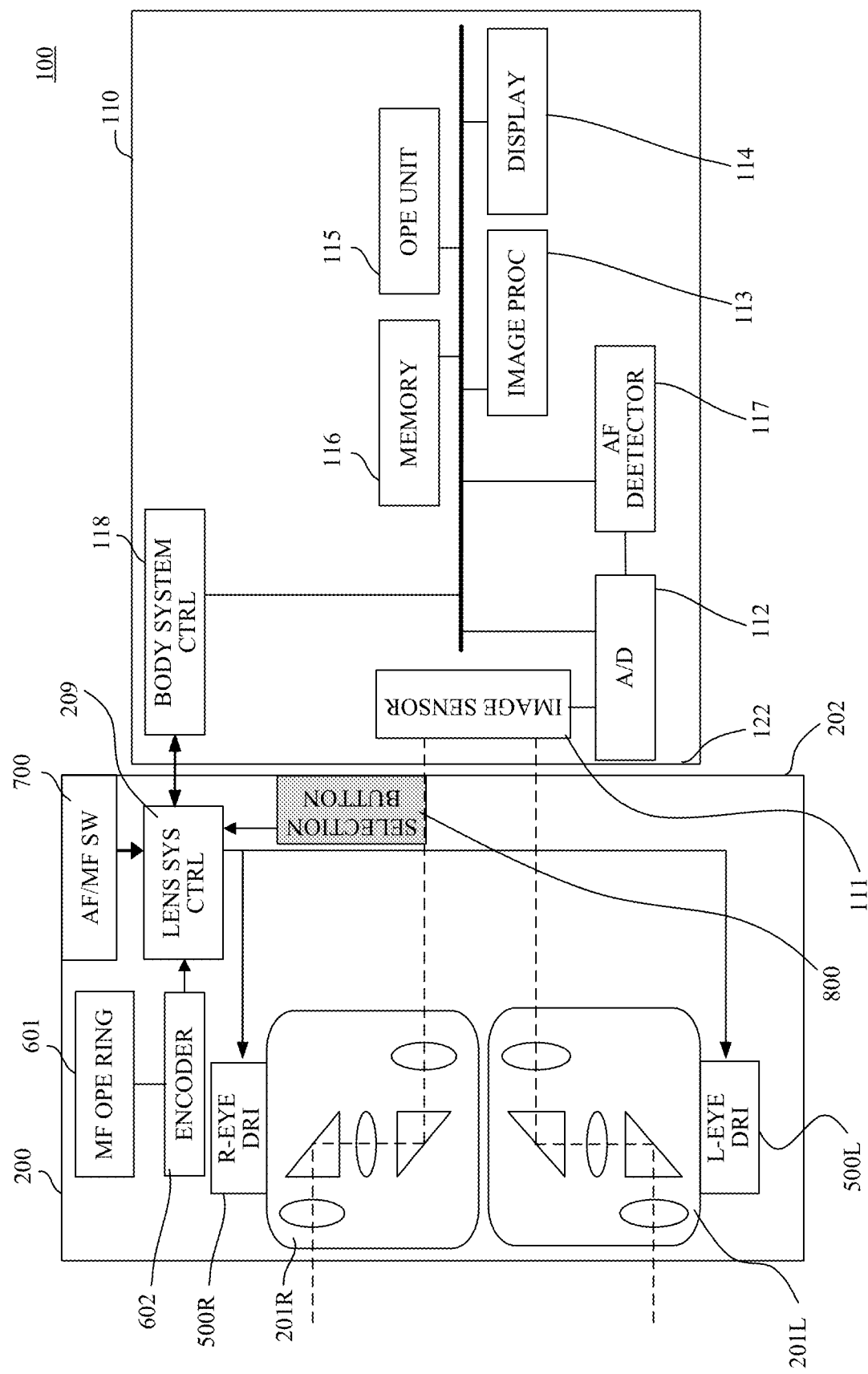
FIG. 9 is an electrical block diagram of the camera system according to Example 2.

FIG. 9 is an electrical block diagram of the camera system 100 according to this example. The basic configuration of the camera system 100 is the same as that of Example 1, but the selection button 800 is added to the interchangeable lens 200. The lens system control unit 209 determines the optical system selected by the selection button 800 and moves the selected optical system according to the rotation of the MF operation ring 601.

Figure 10A:
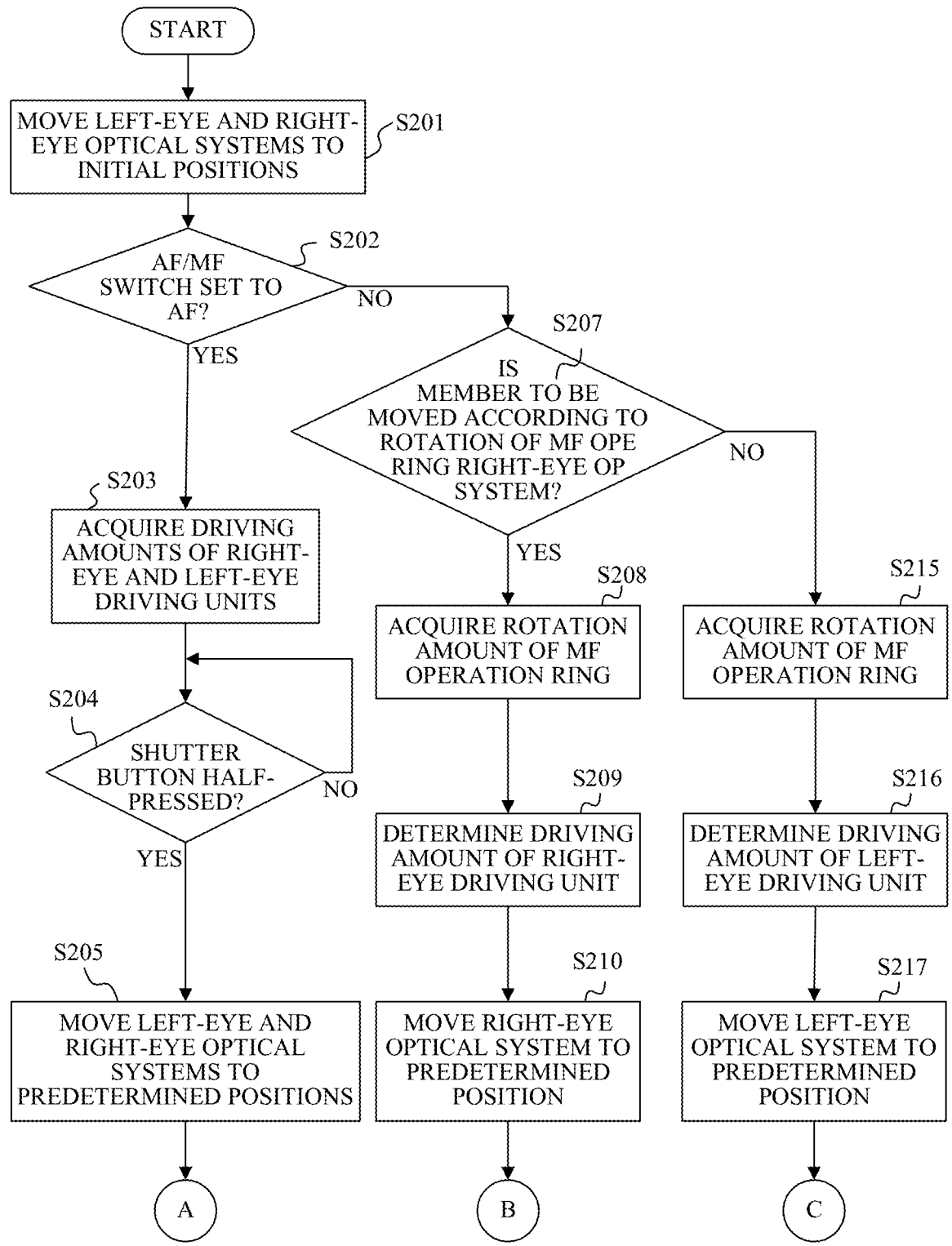
FIGS. 10A and 10B are flowcharts illustrating processing in determining motion of a focus lens according to Example 2.
Figure 10B:
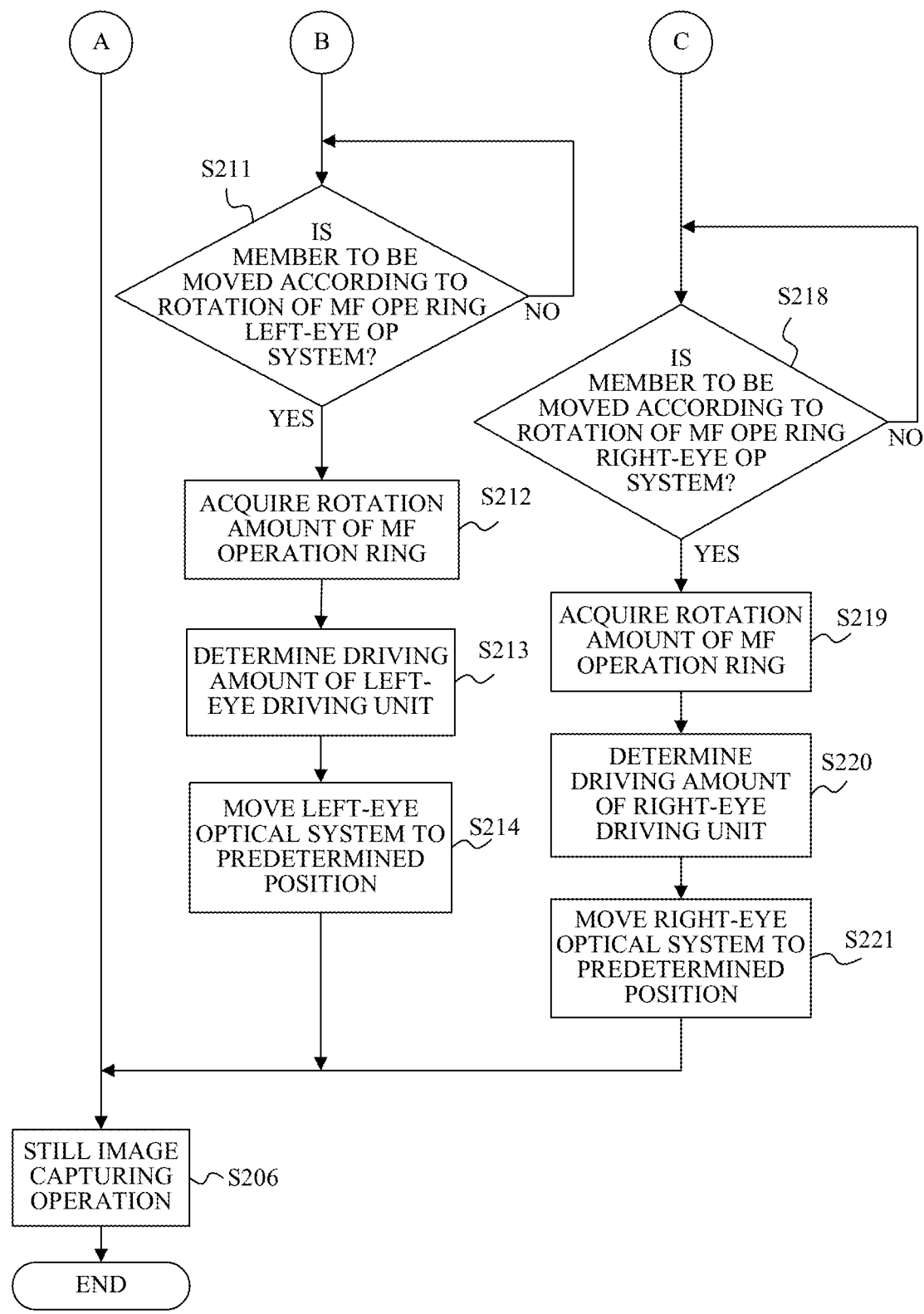

FIGS. 10A and 10B are flowcharts illustrating processing in determining motion of the focus lens by the body system control unit 118 and the lens system control unit 209 according to this example. The flows of FIGS. 10A and 10B are started when the camera system 100 is powered on.

Step S201 to step S206 correspond to step S101 to step S106 in FIG. 7, so a description thereof will be omitted.

In step S207, the lens system control unit 209 determines whether the optical system selected by the photographer using the selection button 800 and to be moved according to the rotation of the MF operation ring 601 is the right-eye optical system 201R. In a case where it is determined that the optical system is the right-eye optical system 201R, the processing of step S208 is executed, and in a case where it is determined that the optical system is the left-eye optical system 201L, rather than the right-eye optical system 201R, the processing of step S215 is executed.

Step S208 corresponds to step S109 in FIG. 7, so a description thereof will be omitted.

In step S209, the lens system control unit 209 determine the driving amount of the right-eye driving unit 500R using the rotation amount of the MF operation ring 601.

In step S210, the lens system control unit 209 drives the right-eye driving unit 500R using the driving amount determined in step S209, and moves the right-eye optical system 201R to a predetermined position.

In step S211, the lens system control unit 209 determines whether the left-eye optical system 201L is the optical system selected by the photographer using the selection button 800 and to be moved according to the rotation of the MF operation ring 601. In a case where it is determined that the optical system is the left-eye optical system 201L, the processing of step S212 is executed, and in a case where it is determined that the optical system is not the left-eye optical system 201L, the processing of step S211 is executed again.

Step S212 corresponds to step S109 in FIG. 7, so a description will be omitted.

In step S213, the lens system control unit 209 determine the driving amount of the left-eye driving unit 500L using the rotation amount of the MF operation ring 601.

In step S214, the lens system control unit 209 drives the left-eye driving unit 500L using the driving amount determined in step S213, and moves the left-eye optical system 201L to a predetermined position.

Step S215 to step S221 correspond to step S212 to step S214 and step S207 to step S210, respectively, and thus a description thereof will be omitted.

In this example, step S207 determines whether or not the optical system is the right-eye optical system 201R, but may determines whether or not the optical system is the left-eye optical system 201L. In this case, in step S211, it is determined whether the optical system is the right-eye optical system 201R, and in step S218, it is determined whether the optical system is the left-eye optical system 201L.

The configuration according to this example enables the photographer to select the optical system to be moved by simply pressing a button. Since the photographer can individually adjust the optical systems for the left-eye and right-eyes, highly accurate focusing of the left-eye and right-eye optical systems can be performed, and high-quality images can be obtained.

This example may provide a tactile feedback device such as haptics technology inside the MF operation ring 601 to change an operation sense depending on the selected optical system (selection result of the selection button 800). This configuration enables the photographer to easily determine which optical system is to be selected.

Example 3

The camera system 100 according to this example is different from the camera system 100 according to Example 1 in the configuration of the interchangeable lens 200. The configuration of the camera body 110 is similar to that of Example 1. This example will discuss configurations different from those of Example 1, and will omit a description of common configurations.

Figure 11:
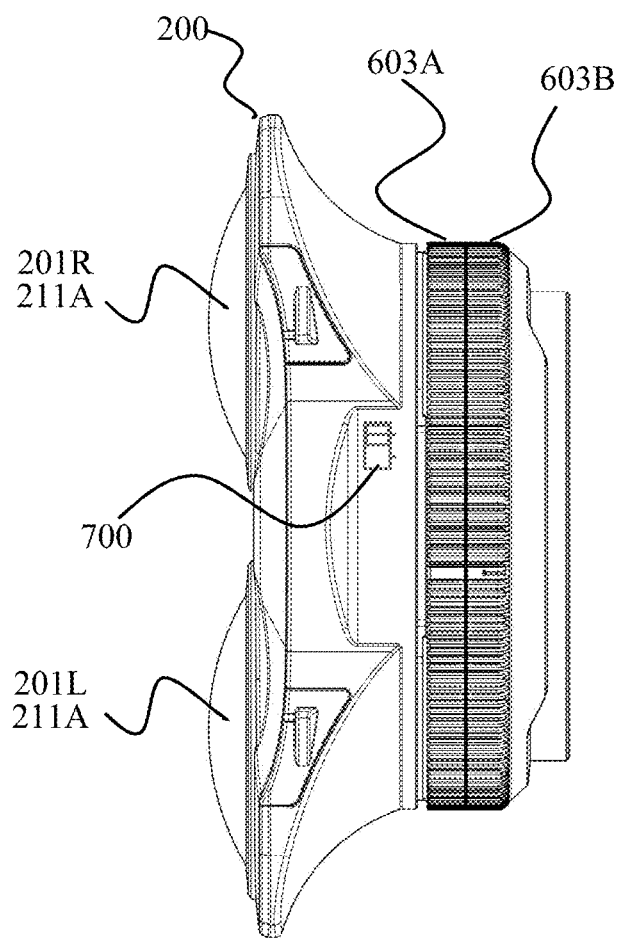
FIG. 11 is a top view of an interchangeable lens according to Example 3.

FIG. 11 is a top view of the interchangeable lens 200 according to this example. In this example, the interchangeable lens 200 has a first MF operation ring 603A for moving the right-eye optical system 201R and a second MF operation ring 603B for moving the left-eye optical system 201L. In a case where the photographer rotates the first MF operation ring 603A while the AF/MF switch 700 is set to "MF," the right-eye optical system 201R moves in the optical axis direction. In a case where the photographer rotates the second MF operation ring 603B while the AF/MF switch 700 is set to "ME" the left-eye optical system 201L moves in the optical axis direction.

Figure 12:
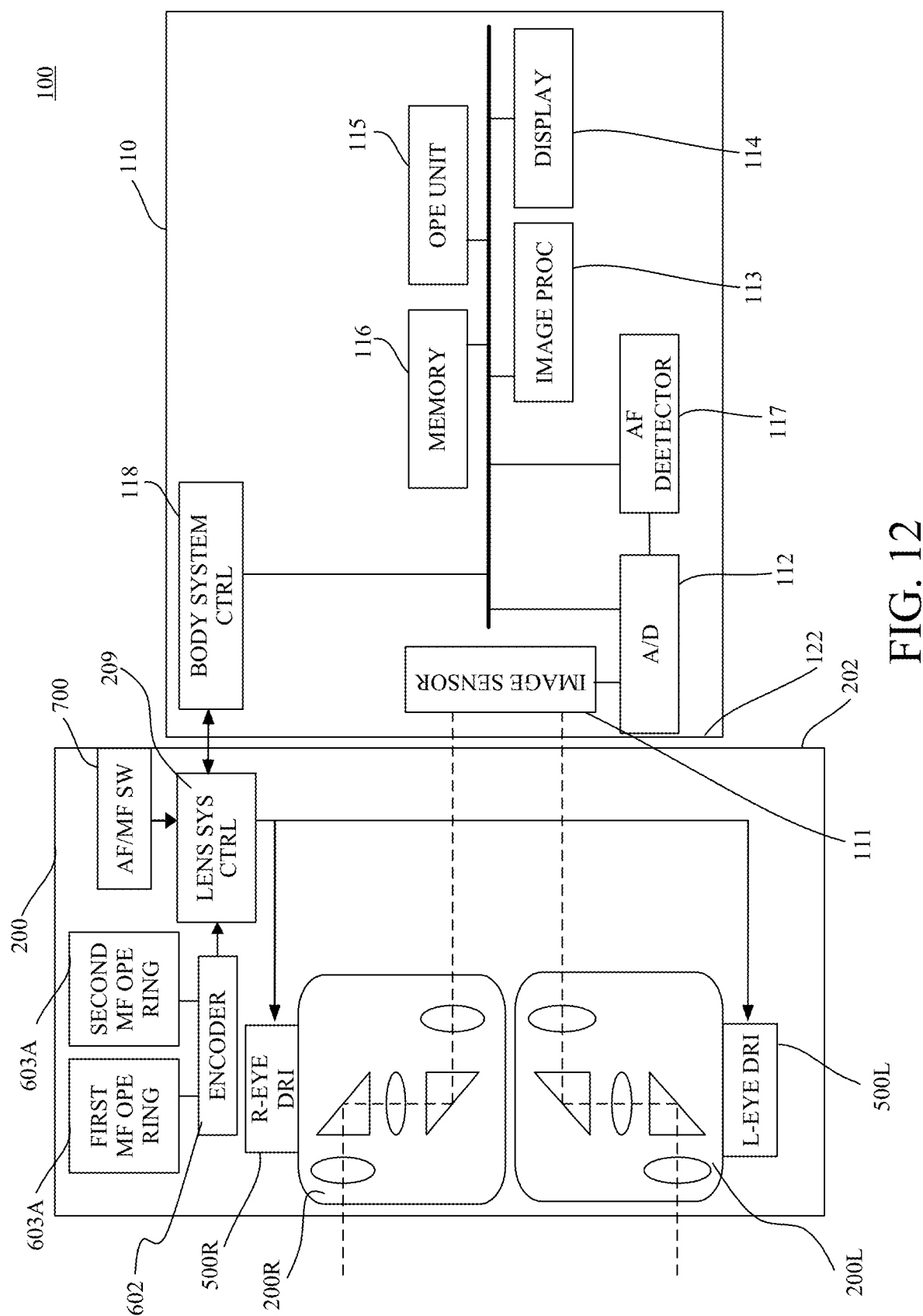
FIG. 12 is an electrical block diagram of the camera system according to Example 3.

FIG. 12 is an electrical block diagram of the camera system 100 according to this example. The basic configuration of the camera system 100 is the same as that of Example 1, but the interchangeable lens 200 further includes the first MF operation ring 603A and the second MF operation ring 603B. The lens system control unit 209 acquires a rotation amount of the first MF operation ring 603A by the photographer detected by the encoder 602, and determines a driving amount of the right-eye driving unit 500R using the acquired rotation amount of the first MF operation ring 603A. The lens system control unit 209 acquires a rotation amount of the second MF operation ring 603B by the photographer detected by the encoder 602, and determines a driving amount of the left-eye driving unit 500L using the acquired rotation amount of the second MF operation ring 603B.

Figure 13:
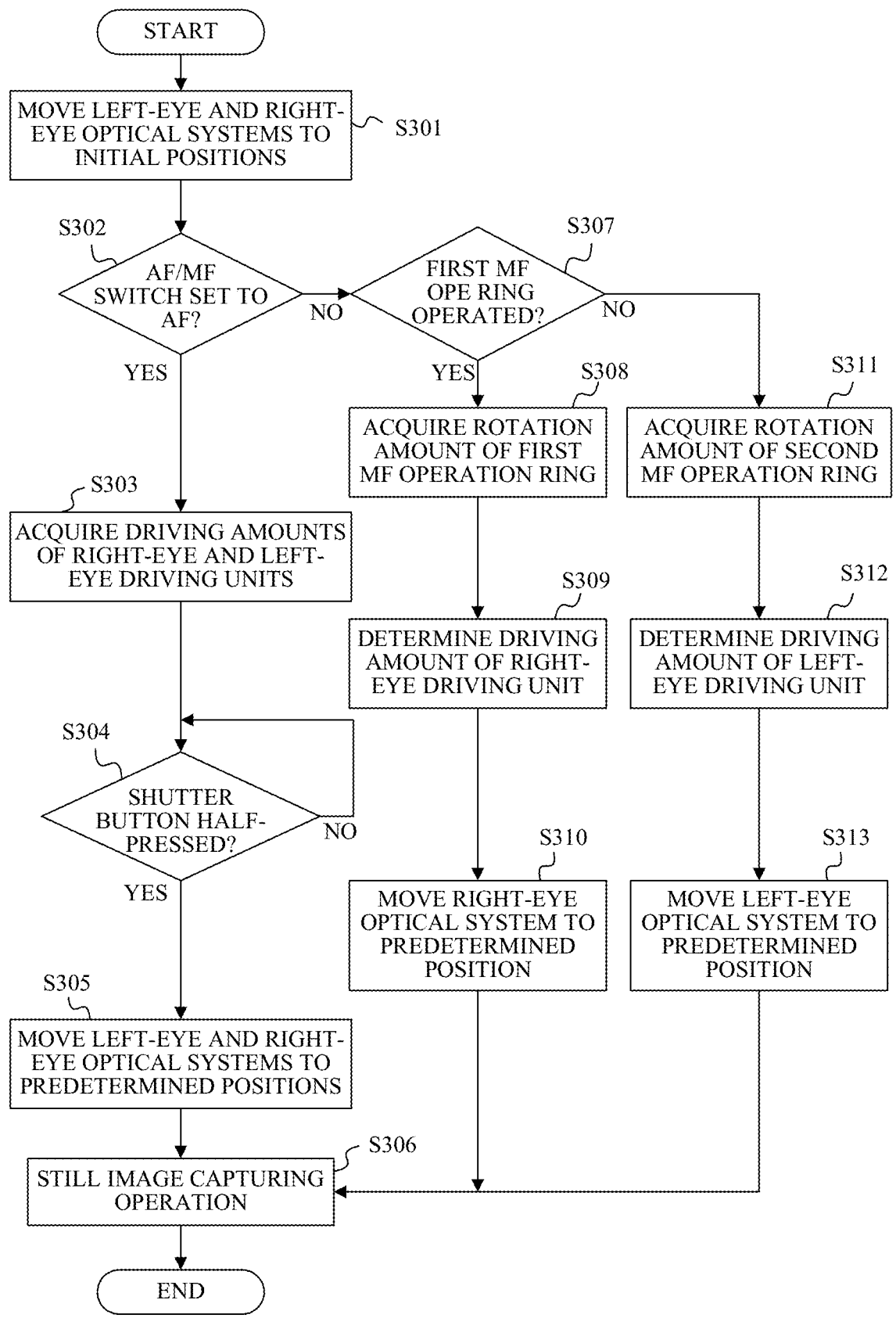
FIG. 13 is a flowchart illustrating processing in determining motion of a focus lens according to Example 3.

FIG. 13 is a flowchart illustrating processing in determining motion of the focus lens by the body system control unit 118 and the lens system control unit 209 according to this example. The flow of FIG. 13 is started when the camera system 100 is powered on.

Step S301 to step S306 correspond to step S101 to step S106 in FIG. 7, respectively, and a description thereof will be omitted.

In step S307, the lens system control unit 209 determines whether the first MF operation ring 603A has been operated. In a case where it is determined that the first MF operation ring 603A has been operated, the processing of step S308 is executed. In a case where it is determined that the first MF operation ring 603A has not been operated, that is, the second MF operation ring 603B has been operated, the processing of step S311 is executed.

In step S308, the lens system control unit 209 acquires a rotation amount of the first MF operation ring 603A by the photographer detected by the encoder 602.

In step S309, the lens system control unit 209 determine a driving amount of the right-eye driving unit 500R using the rotation amount of the first MF operation ring 603A.

In step S310, the lens system control unit 209 drives the right-eye driving unit 500R using the driving amount determined in step S309 and move the right-eye optical system 201R to a predetermined position.

In step S311, the lens system control unit 209 acquires a rotation amount of the second MF operation ring 603B by the photographer detected by the encoder 602.

In step S312, the lens system control unit 209 determine a driving amount of the left-eye driving unit 500L using the rotation amount of the second MF operation ring 603B.

In step S313, the lens system control unit 209 drives the left-eye driving unit 500L using the driving amount determined in step S312, and moves the left-eye optical system 201L to a predetermined position.

The configuration according to this example provides MF operation rings respectively corresponding to the right-eye optical system 201R and the left-eye optical system 201L, and enables the photographer to easily perform focusing of the left-eye and right-eye optical systems. Since the first MF operation ring 603A and the second MF operation ring 603B are disposed side by side on the optical axes, the operability of the photographer is not impaired.

This example may provide a tactile feedback device such as haptics technology inside each MF operation ring, and a different operation sense for each MF operation ring. Thereby, the photographer can easily determine which optical system to move. In addition, the load torque of the MF operation ring may be physically changed between left and right so that the photographer can easily determine which optical system to move.

Example 4

Figure 14:
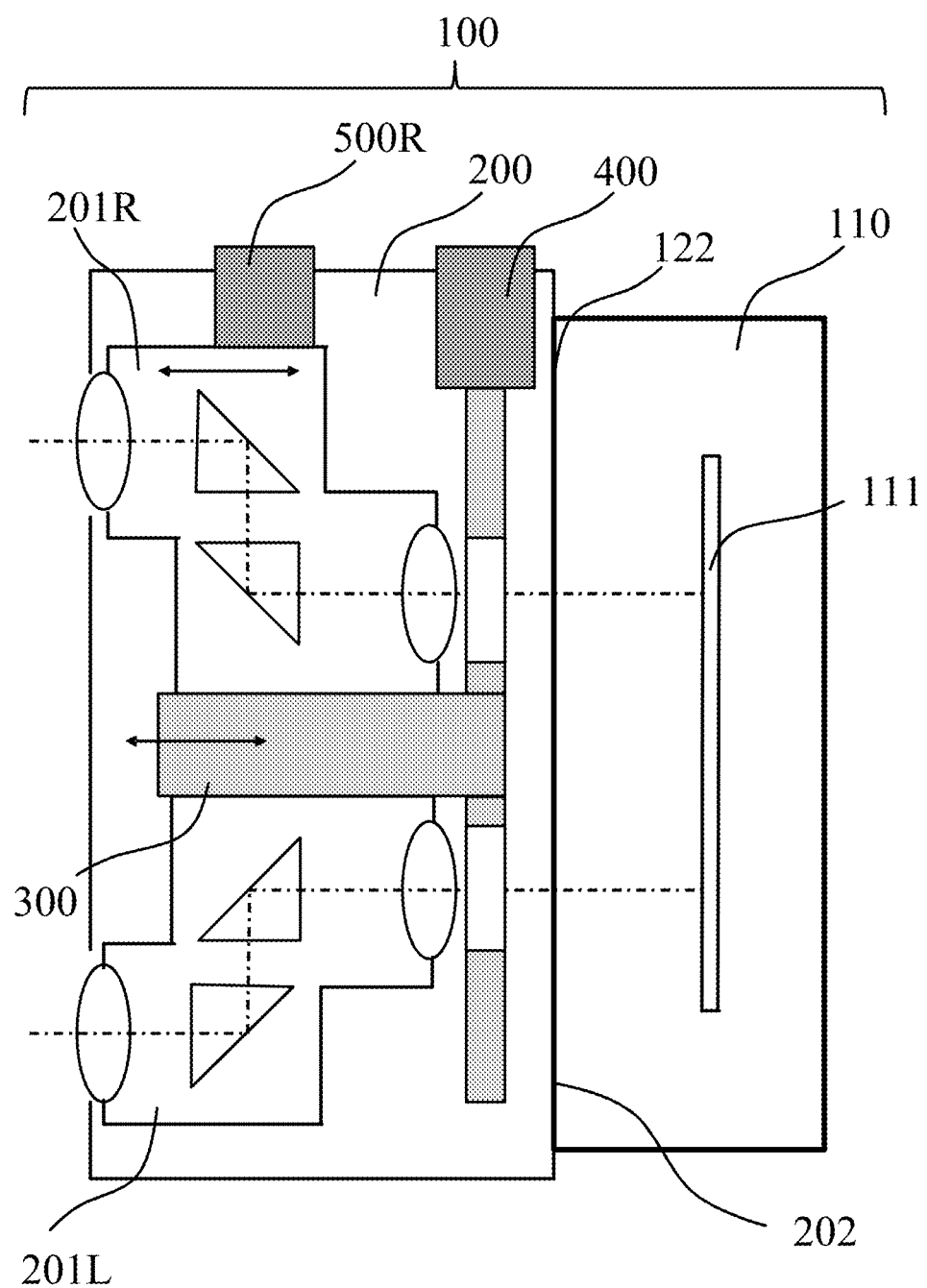
FIG. 14 is a schematic configuration diagram of each of camera systems according to Examples 4 to 6.

FIG. 14 is a schematic configuration diagram of a camera system 100 according to this example. The basic configuration of the camera system 100 according to this example is the same as that of the camera system 100 according to Example 1. The configuration of the camera body 110 is similar to that in Examples 1 to 3. This example will discuss configurations different from those of Examples 1 to 3, and will omit a description of the common configuration.

The interchangeable lens 200 includes the right-eye optical system 201R and the left-eye optical system 201L. In this example, the left-eye optical system 201L is fixed to the lens base 300, and the right-eye optical system 201R is supported by the lens base 300 so as to be movable relative to the lens base 300 in a direction orthogonal to the imaging surface of the image sensor 111. The interchangeable lens 200 further includes a driving unit (second adjusting unit) 400 for moving the lens base 300, and a right-eye driving unit 500R configured to move the right-eye optical system 201R relative to the lens base 300 for adjusting relative focal positions of the left-eye and right-eye optical systems.

The driving unit 400 moves the left-eye and right-eye optical systems by moving the lens base 300. That is, the driving unit 400 can simultaneously perform focusing of the left-eye and right-eye optical systems. In this example, each of the right-eye optical system 201R and the left-eye optical system 201L includes a lens unit in which an imaging optical system is integrated, so that focusing can be performed by moving the entire optical system.

As described in Example 1, the interchangeable lens 200 is attached to the camera body 110 via the lens mount unit 202 and camera mount unit 122. The image sensor 111 is installed so that its imaging surface is parallel to the lens mount unit 202. However, it is difficult to make the imaging surface perfectly parallel to the lens mount unit 202 due to manufacturing errors, and the image sensor 111 may be actually fixed with the imaging surface slightly tilted relative to the lens mount unit 202. This example configures the right-eye optical system 201R to be movable in the direction orthogonal to the imaging surface, and can adjust relative focus positions of the left-eye and right-eye optical systems.

In a case where the flange backs of the right-eye optical system 201R and the left-eye optical system 201L are adjusted for each imaging, adjustment work time may miss the photo opportunity and complicate the operation. In this example, the right-eye driving unit 500R moves the right-eye optical system 201R to eliminate a focus difference between left and right images. When the driving unit 400 moves the lens base 300, the left-eye and right-eye optical systems are simultaneously moved in the direction orthogonal to the imaging surface for simultaneous focusing while the left-eye and right-eye optical systems are integrally held. Due to this configuration, focusing can be quickly and accurately performed by a simple method.

The interchangeable lens 200 according to this example has an external configuration similar to that of the interchangeable lens 200 according to Example 1 described with reference to FIG. 5.

Figure 15:
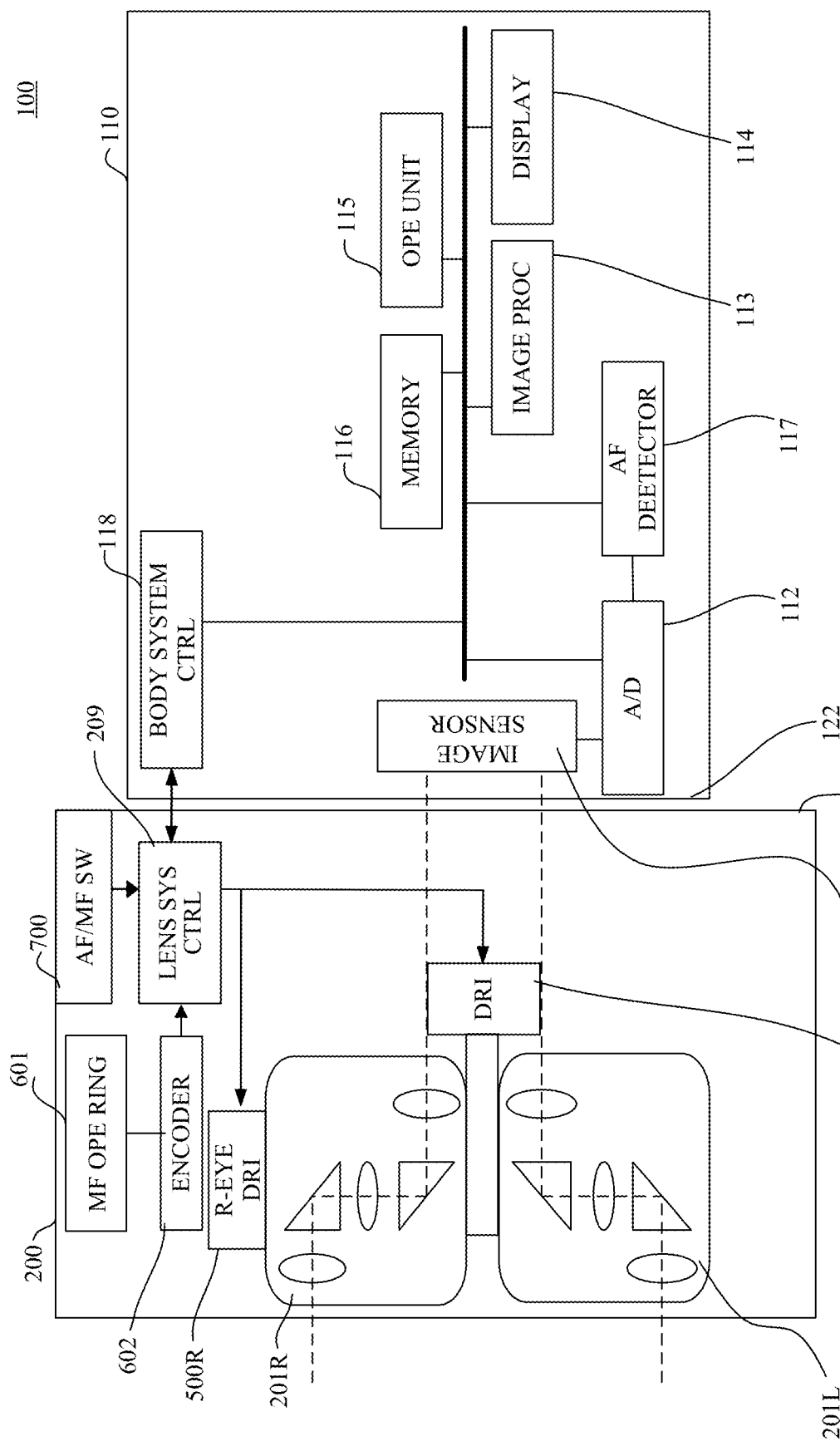
FIG. 15 is an electrical block diagram of the camera system according to Example 4.

FIG. 15 is an electrical block diagram of the camera system 100 according to this example. The basic configuration of the camera system 100 is the same as that of Example 1, but the interchangeable lens 200 further includes the driving unit 400. The lens system control unit 209 determines a driving amount of the driving unit 400 using a detection result of the encoder 602.

A right-eye image formed via the right-eye optical system 201R and a left-eye image formed via the left-eye optical system 201L are formed side by side on the image sensor 111 as object images. The image sensor 111 converts the formed object images (optical signals) into analog electrical signals. The A/D converter 112 converts the analog electrical signals output from the image sensor 111 into digital electrical signals (image signals). The A/D converter 112 may be built in the image sensor 111. The image processing unit 113 performs various image processing for the digital electric signals (image signals) output from the A/D converter 112.

The AF detector 117 calculates driving amounts of the driving unit 400 and the right-eye driving unit 500R using the digital electrical signals output from the A/D converter 112. In this example, for example, the AF detector 117 determines the driving amount of the right-eye driving unit 500R from a difference between left-eye and right-eye images, and determines the driving amount of the driving unit 400 from information on the left-eye image. Thereby, an AF configuration can be realized for integrally moving the left-eye and right-eye optical systems with a simple configuration while eliminating a focus difference between the left and right images.

Figure 16:
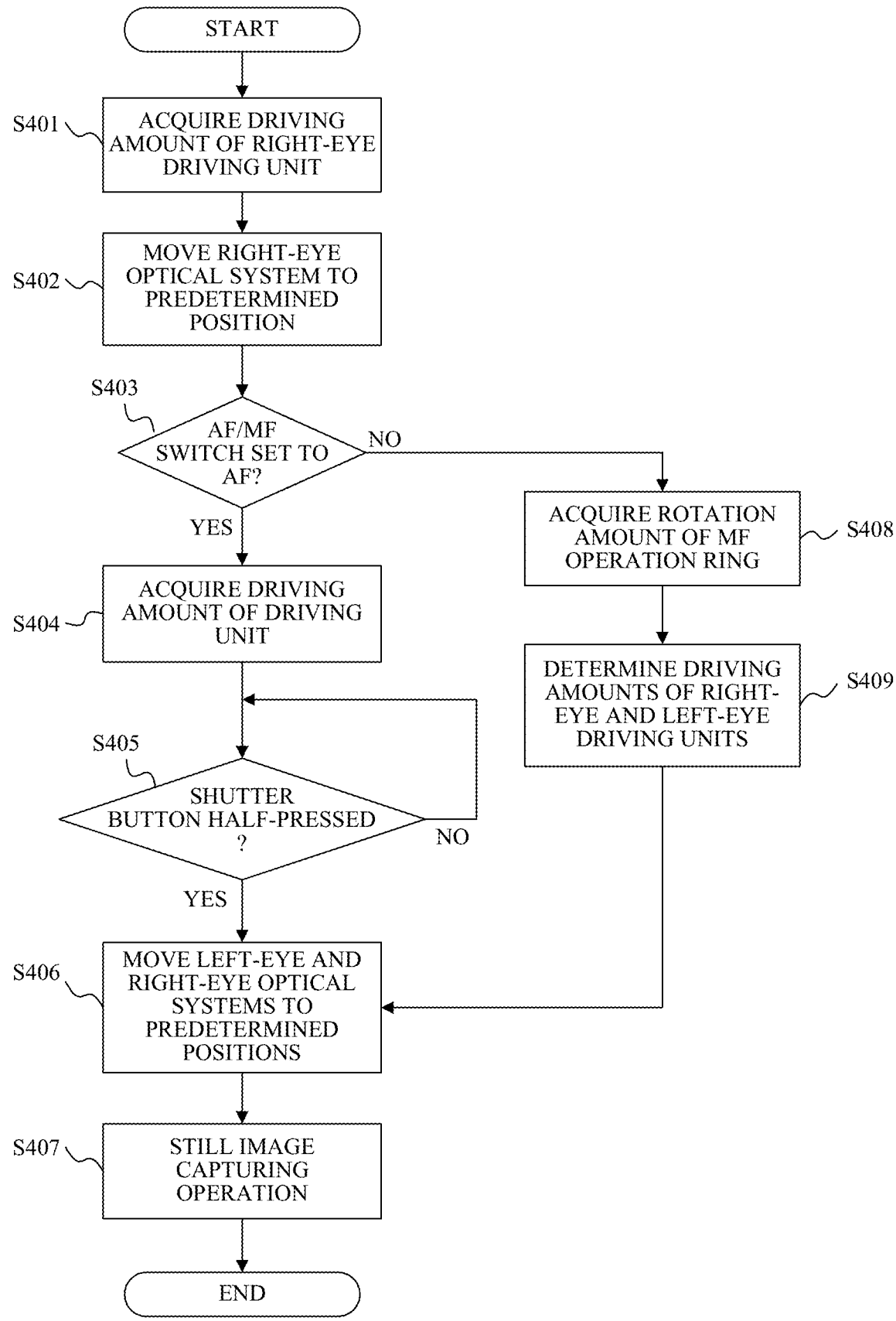
FIG. 16 is a flowchart illustrating processing in determining motion of a focus lens according to Example 4.

FIG. 16 is a flowchart illustrating processing in determining motion of the focus lens by the body system control unit 118 and the lens system control unit 209 according to this example. The flow of FIG. 16 is started when the camera system 100 is powered on.

In step S401, the lens system control unit 209 acquires a driving amount of the right-eye driving unit 500R calculated by the AF detector 117 using a focus difference between left and right images.

In step S402, the lens system control unit 209 drives the right-eye driving unit 500R with the driving amount acquired in step S101, and moves the right-eye optical system 201R to a predetermined position. Thereby, the focus difference between the left and right images is eliminated.

In step S403, the lens system control unit 209 determines whether the AF/MF switch 700 is set to "AF." If it is determined that the AF/MF switch 700 is set to "AF," the processing of step S404 is executed, and if it is determined that the AF/MF switch 700 is not set to "AF," that is, the AF/MF switch 700 is set to "MF," the processing of step S408 is executed.

In step S404, the lens system control unit 209 acquires a driving amount of the driving unit 400 calculated by the AF detector 117 using the AF detection result of the left-eye image.

In step S405, the lens system control unit 209 determines whether or not a half-pressing operation of the shutter button by the photographer has been detected. In a case where it is determined that the half-pressing operation of the shutter button has been detected, the processing of step S406 is executed, and in a case where it is determined otherwise, the processing of step S405 is executed again.

In step S406, the lens system control unit 209 drives the driving unit 400 with the driving amount acquired in step S404 or determined in step S409, which will be described below, and moves the lens base 300. Thereby, the left-eye and right-eye optical systems are moved to predetermined positions.

In step S407, the lens system control unit 209 executes a still image capturing operation according to a full-pressing operation of the shutter button by the photographer.

In step S408, the lens system control unit 209 acquires a rotation amount of the MF operation ring 601 by the photographer detected by the encoder 602.

In step S409, the lens system control unit 209 determines a driving amount of the driving unit 400 using the rotation amount of the MF operation ring 601.

This example first moves the right-eye optical system 201R to eliminate a focus difference between left and right images, and thus drives only the driving unit 400 according to the rotation of the MF operation ring 601.

The configuration according to this example enables the photographer to switch between the AF mode and the MF mode with a simple operation. Even if the left-eye and right-eye optical systems are mounted, this embodiment can easily perform focusing of the left-eye and right-eye optical systems by rotating the MF operation ring 601. Since the right-eye driving unit 500R is automatically driven by the AF detector 117 in both the AF mode and the MF mode so as to eliminate a focus difference between left and right images, the photographer can operate the MF operation ring 601 without being worried about a focus difference between left and right images.

In this example, the AF detector 117 determines a driving amount of the driving unit 400 using an AF detection result of a left-eye image, but as long as a focus difference between left and right images is previously eliminated, the AF detector 117 may use any part of a captured image for detection.

Example 5

The camera system 100 according to this example is different from the camera system 100 according to Example 4 in the configuration of the interchangeable lens 200. The configuration of the camera body 110 is similar to that of Example 4. This example will discuss configurations different from those of Example 4, and will omit a description of common configurations.

The interchangeable lens 200 according to this example has an external configuration similar to that of the interchangeable lens 200 according to Example 2 described with reference to FIG. 8. In this example, the photographer can select which of the right-eye optical system 201R and the lens base 300 is to be moved in a case where the MF operation ring 601 is rotated, using the selection button 800.

Figure 17:
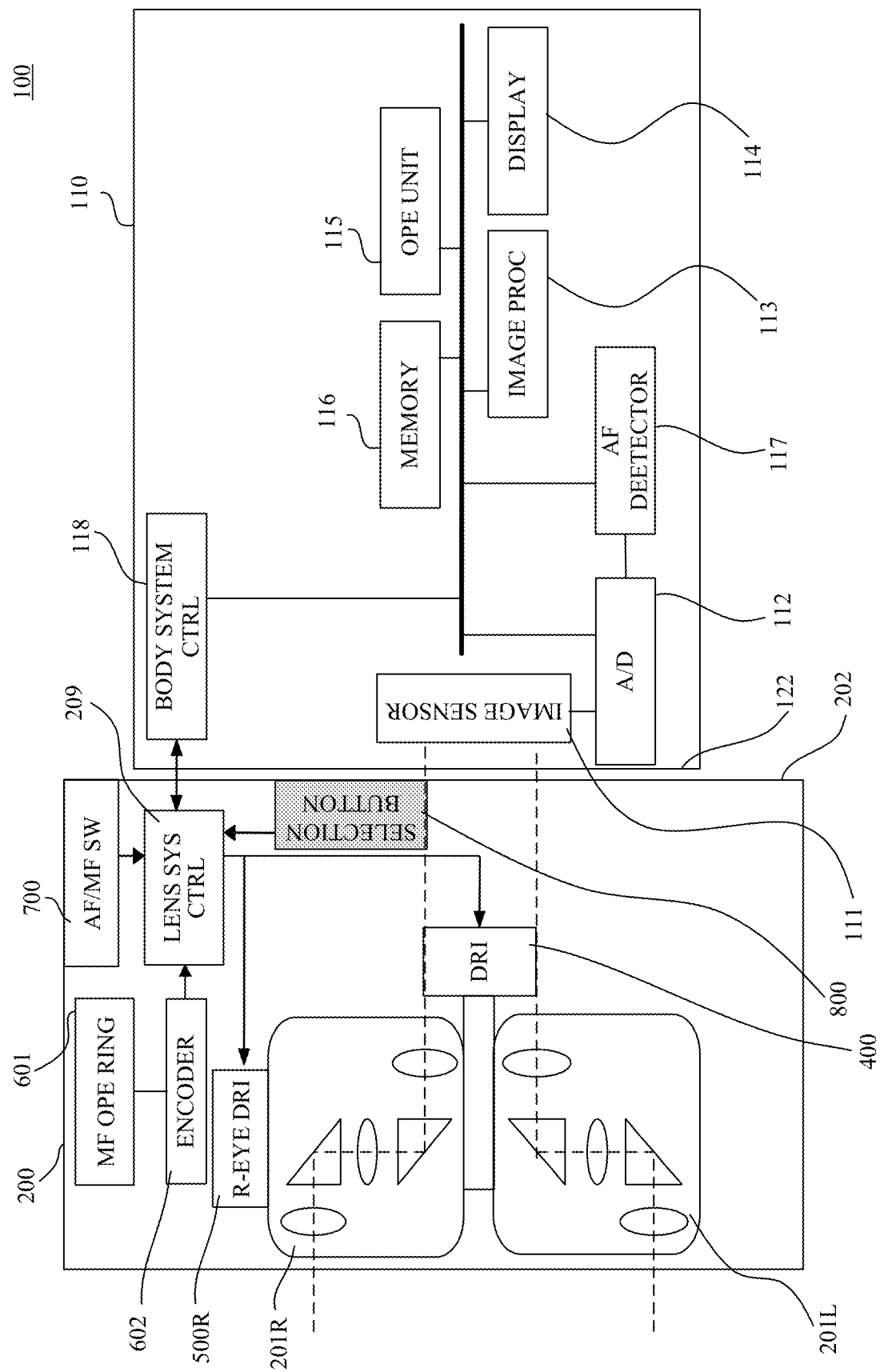
FIG. 17 is an electrical block diagram of the camera system according to Example 5.

FIG. 17 is an electrical block diagram of the camera system 100 according to this example. The basic configuration of the camera system 100 is the same as that of Example 4, but the interchangeable lens 200 further includes the selection button 800. The lens system control unit 209 determines a member selected by the selection button 800 (which is the right-eye optical system 201R or the lens base 300), and moves the selected member according to the rotation of the MF operation ring 601.

Figure 18A:
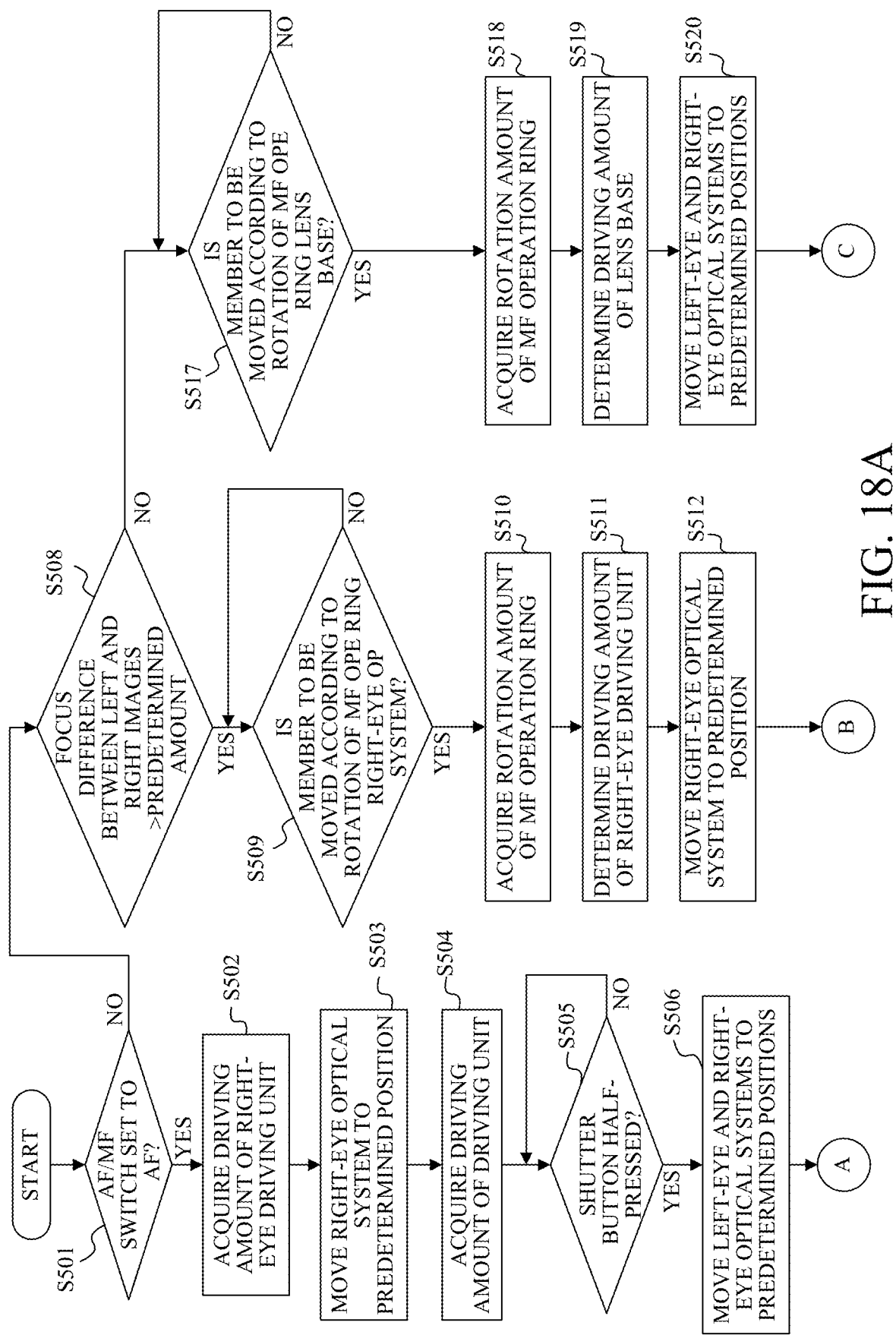
FIGS. 18A and 18B are flowcharts illustrating processing in determining motion of a focus lens according to Example 5.
Figure 18B:
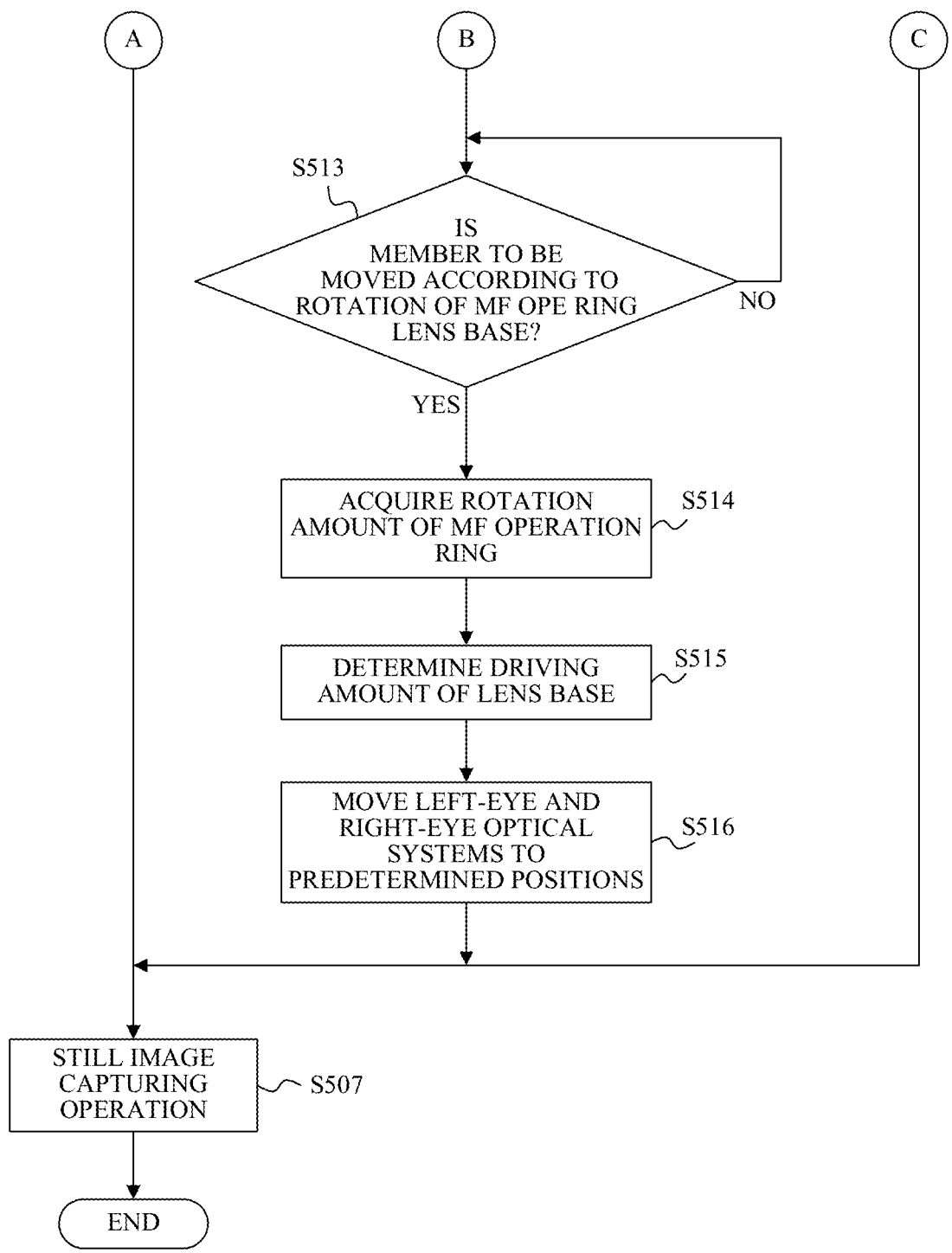

FIGS. 18A and 18B are flowcharts illustrating processing in determining motion of the focus lens by the body system control unit 118 and the lens system control unit 209 according to this example. The flow of FIGS. 18A and 18B starts when the camera system 100 is powered on.

In step S501, the lens system control unit 209 determines whether the AF/MF switch 700 is set to "AF." In a case where it is determined that the AF/MF switch 700 is set to "AF," the processing of step S502 is executed, and in a case where it is determined that the AF/MF switch 700 is not set to "AF," that is, the AF/MF switch 700 is set to "MF," the processing of S508 is executed.

Steps S502 to S507 correspond to steps S401, S402, and S404 to S407 in FIG. 16, respectively, and thus a description thereof will be omitted.

In step S508, the lens system control unit 209 determines whether a focus difference between left and right images is larger than a predetermined value. In a case where it is determined that the focus difference between the left and right images is larger than the predetermined value, the processing of step S509 is executed, and in a case where it is determined that the focus difference between the left and right images is smaller than the predetermined value, the processing of step S517 is executed. In a case where the focus difference between the left and right images is equal to the predetermined value, which step is to be executed can be arbitrarily set.

In step S509, the lens system control unit 209 determines whether the member selected by the photographer using the selection button 800 and moved according to the rotation of the MF operation ring 601 is the right-eye optical system 201R. In a case where it is determined that the member is the right-eye optical system 201R, the processing of step S510 is executed, and in a case where it is determined that the member is not the right-eye optical system 201R, that is, the member is the lens base 300, the processing of step S509 is executed again.

Steps S510 to S512 correspond to steps S208 to S210 in FIGS. 10A and 10B, respectively, so a description thereof will be omitted.

In step S513, the lens system control unit 209 determines whether the member selected by the photographer using the selection button 800 and to be moved according to the rotation of the MF operation ring 601 is the lens base 300. In a case where it is determined that the member is the lens base 300, the processing of step S514 is executed, and in a case where it is determined that the member is not the lens base 300, that is, the member is the right-eye optical system 201R, the processing of step S513 is executed again.

Step S514 corresponds to step S510, so a description thereof is omitted.

In step S515, the lens system control unit 209 determines the driving amount of the lens base 300 using the rotation amount of the MF operation ring 601.

In step S516, the lens system control unit 209 drives the lens base 300 using the driving amount determined in step S515 and moves the left-eye and right-eye optical systems to predetermined positions.

In step S517, the lens system control unit 209 determines whether or not the member selected by the photographer using the selection button 800 and to be moved according to the rotation of the MF operation ring 601 is the lens base 300. In a case where it is determined that the member is the lens base 300, the processing of step S518 is executed, and in a case where it is determined that the member is not the lens base 300, that is, the member is the right-eye optical system 201R, the processing of step S517 is executed again.

Step S518 to step S520 correspond to S514 to step S516, respectively, so a description thereof will be omitted.

The configuration according to this example enables the photographer to select the member to be moved by simply pressing a button. In a case where there is a focus difference between left and right images, the photographer selects the right-eye optical system 201R to eliminate the focus difference between left and right images. In a case where there is no focus difference between left and right images, the photographer can easily perform left and right focusing by selecting the lens base 300 and rotating the MF operation ring 601.

A driving amount of the driving unit due to the rotation of the MF operation ring 601 (a driving amount of the driving unit corresponding to the unit operation of the MF operation ring 601) in a case where the right-eye optical system 201R is selected and that in a case where the lens base 300 is selected may be changed. Due to this configuration, for example, in a case where the right-eye optical system 201R is selected, by reducing a driving amount per rotation of the MF operation ring 601 (by increasing the resolution), the photographer can improve the efficiency of delicate adjustment work for adjusting a focus difference between left and right images.

This example can provide a tactile feedback device such as haptics technology inside the MF operation ring 601 to change an operation sense depending on the selected member. This configuration enables the photographer to easily determine which member is selected.

Example 6

The camera system 100 according to this example is different from the camera system 100 according to Example 4 in the configuration of the interchangeable lens 200. The configuration of the camera body 110 is similar to that of Example 1. This example will discuss configurations different from those of Example 4, and will omit a description of common configurations.

The interchangeable lens 200 according to this example has an external configuration similar to that of the interchangeable lens 200 of Example 3 described with reference to FIG. 11. In this example, the interchangeable lens 200 includes the first MF operation ring 603A for moving the right-eye optical system 201R and the second MF operation ring 603B for moving the lens base 300. In a case where the photographer rotates the first MF operation ring 603A while the AF/MF switch 700 is set to "MF," the right-eye optical system 201R moves in the optical axis direction. In a case where the second MF operation ring 603B is rotated, the lens base 300 moves, thereby the left-eye and right-eye optical systems move in the optical axis direction.

Figure 19:
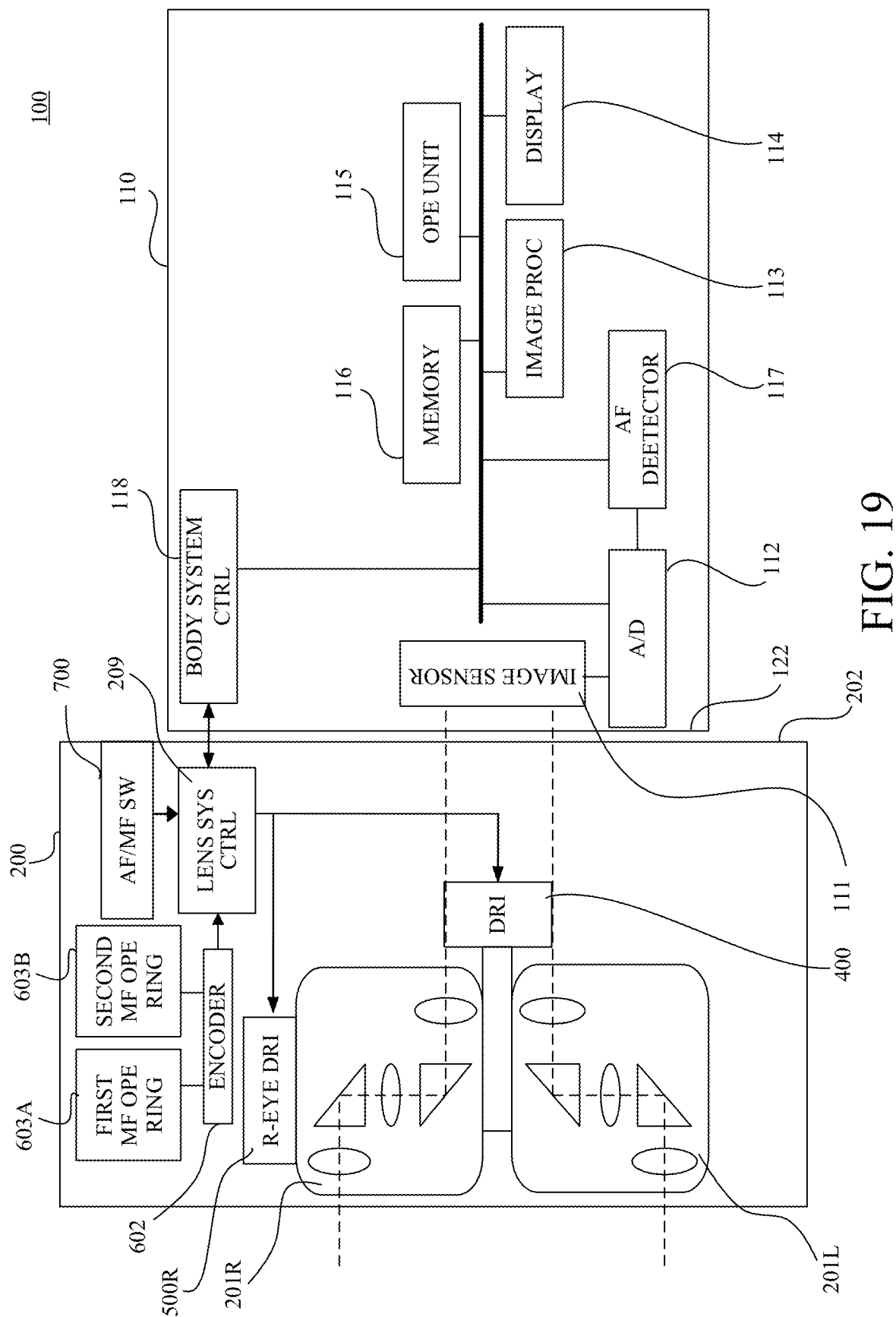
FIG. 19 is an electrical block diagram of the camera system according to Example 6.

FIG. 19 is an electrical block diagram of the camera system 100 according to this example. The basic configuration of the camera system 100 is the same as that of Example 4, but the interchangeable lens 200 further includes the first MF operation ring 603A and the second MF operation ring 603B. The lens system control unit 209 acquires a rotation amount of the first MF operation ring 603A by the photographer detected by the encoder 602, and determines a driving amount of the right-eye driving unit 500R using the acquired rotation amount of the first MF operation ring 603A. The lens system control unit 209 acquires a rotation amount of the second MF operation ring 603B by the photographer detected by the encoder 602, and determines a driving amount of the driving unit 400 using the acquired rotation amount of the second MF operation ring 603B.

Figure 20:
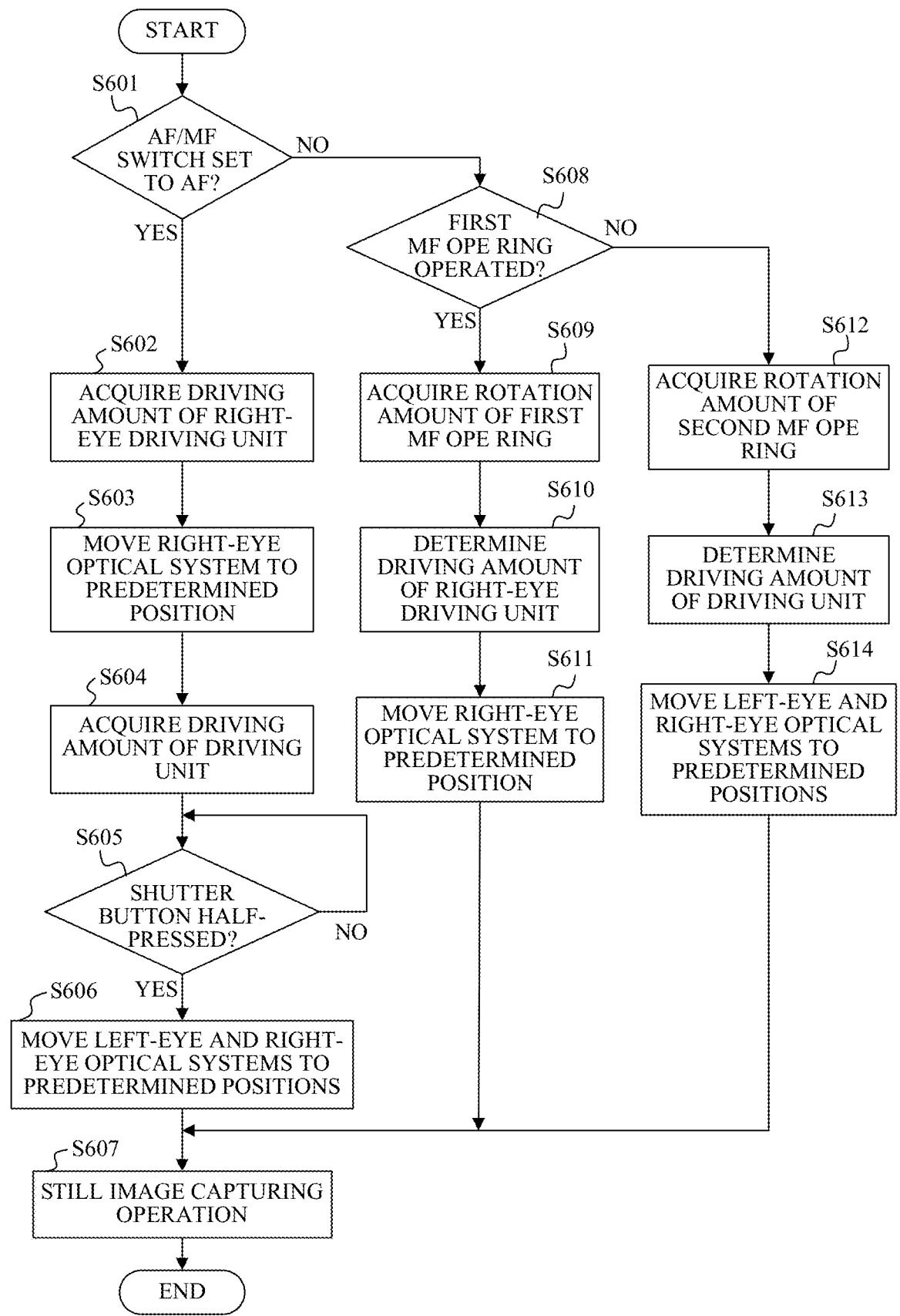
FIG. 20 is a flowchart illustrating the processing in determining motion of the focus lens according to Example 6.

FIG. 20 is a flowchart illustrating processing in determining motion of the focus lens by the body system control unit 118 and the lens system control unit 209 according to this example. The flow of FIG. 20 starts when the camera system 100 is powered on.

Steps S601 through S607 correspond to steps S501 through S506 in FIGS. 18A and 18B, respectively, so a description thereof will be omitted.

In step S608, the lens system control unit 209 determines whether the first MF operation ring 603A has been operated. In a case where it is determined that the first MF operation ring 603A has been operated, the processing of step S609 is executed. In a case where it is determined that the first MF operation ring 603A has not been operated, that is, the second MF operation ring 603B has been operated, the processing of step S612 is executed.

In step S609, the lens system control unit 209 acquires a rotation amount of the first MF operation ring 603A by the photographer detected by the encoder 602.

In step S610, the lens system control unit 209 determine a driving amount of the right-eye driving unit 500R using the rotation amount of the first MF operation ring 603A.

In step S611, the lens system control unit 209 drives the right-eye driving unit 500R using the driving amount determined in step S610 and moves the right-eye optical system 201R to a predetermined position.

In step S612, the lens system control unit 209 acquires the rotation amount of the second MF operation ring 603B by the photographer detected by the encoder 602.

In step S613, the lens system control unit 209 determines a driving amount of the driving unit 400 using the rotation amount of the second MF operation ring 603B.

In step S614, the lens system control unit 209 drives the driving unit 400 using the driving amount determined in step S613 and moves the lens base 300. Thereby, the left-eye and right-eye optical systems are moved to predetermined positions.

The configuration according to this example provides the MF operation rings corresponding to the right-eye optical system 201R and the lens base 300, and enables the photographer to easily perform focusing of the left-eye and right-eye optical systems. Since the first MF operation ring 603A and the second MF operation ring 603B are arranged side by side on the optical axes, the operability of the photographer is not impaired.

This example may provide a tactile feedback device such as a haptic technology inside each MF operation ring so that each MF operation ring may have a different operation sense. Thereby, the photographer can easily determine which member to move. The load torque of the MF operation ring may be physically changed between left and right so that the photographer can easily distinguish which member to move.

Example 7

A camera system 100 according to this example is different from the camera system 100 of Example 4 in the configuration of the interchangeable lens 200. The configuration of the camera body 110 is similar to that of Example 1. This example will discuss configurations different from those of Example 4, and will omit a description of common configurations.

Figure 21:
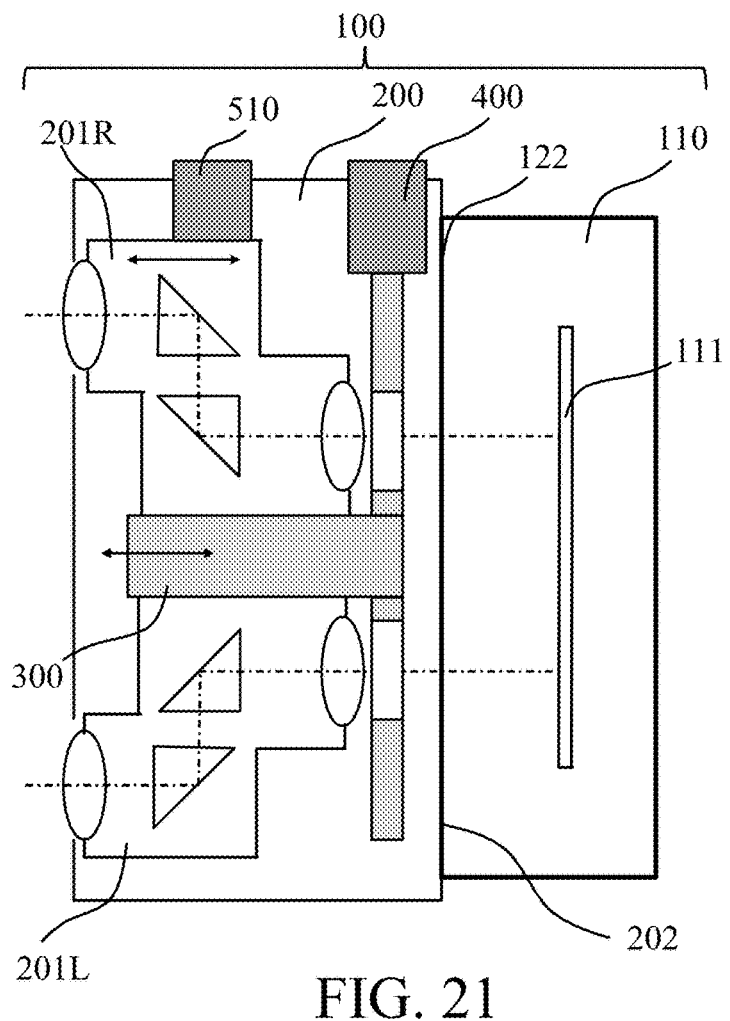
FIG. 21 is a schematic configuration diagram of a camera system according to Example 7.

FIG. 21 is a schematic configuration diagram of the camera system 100 according to this example. In this example, the left-eye optical system 201L is fixed to the lens base 300, and the right-eye optical system 201R is supported on the lens base 300 so as to be movable in the direction orthogonal to the imaging surface of the image sensor 111. In this example, the interchangeable lens 200 includes the driving unit 400 for moving the lens base 300 and a right-eye optical system focusing unit (first adjusting unit) 510 configured to move the right-eye optical system 201R relative to the lens base 300.

Figure 22:
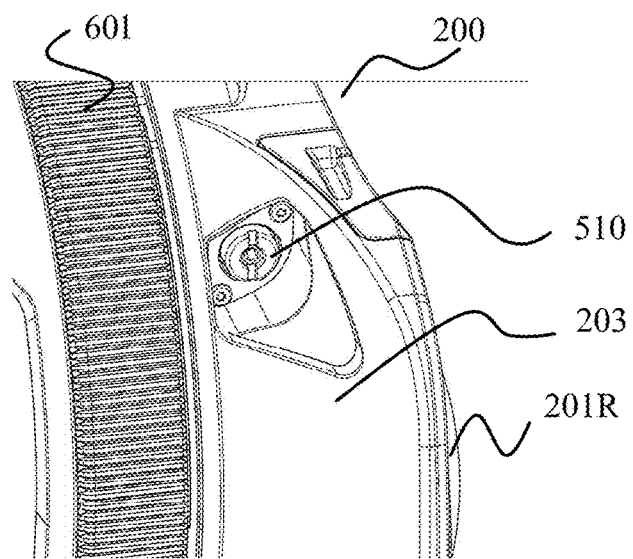
FIG. 22 is an external perspective view of an interchangeable lens according to Example 7.

As illustrated in FIG. 22, the right-eye optical system focusing unit 510 is attached to an exterior cover member 203 so as to be operable by the photographer. The right-eye optical system focusing unit 510 is rotatably held by the exterior cover member 203 and fixed so as not to move in an in-focus direction. The photographer can adjust the flange backs of the left-eye and right-eye optical systems by operating the right-eye optical system focusing unit 510 according to the tilt of the image sensor 111. Previously adjusting the relative shift between the flange backs of the left-eye and right-eye optical systems can perform simultaneous focusing operation of the left-eye and right-eye optical systems by driving only the driving unit 400 during imaging.

Figure 23:
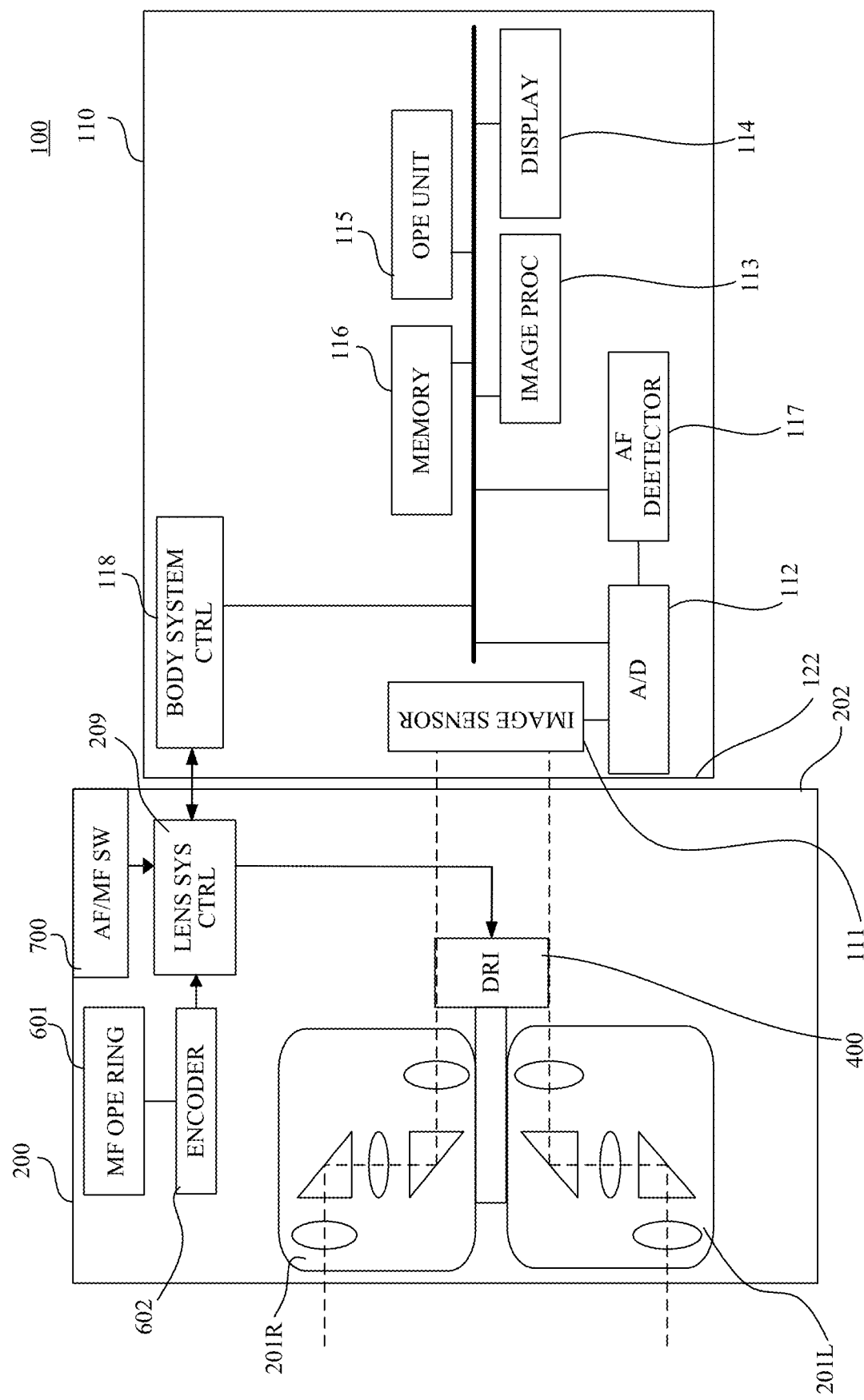
FIG. 23 is an electrical block diagram of the camera system according to Example 7.

FIG. 23 is an electrical block diagram of the camera system 100 according to this example. Although the basic configuration of the camera system 100 is the same as that of Example 4, the interchangeable lens 200 does not include the right-eye driving unit 500R.

Figure 24:
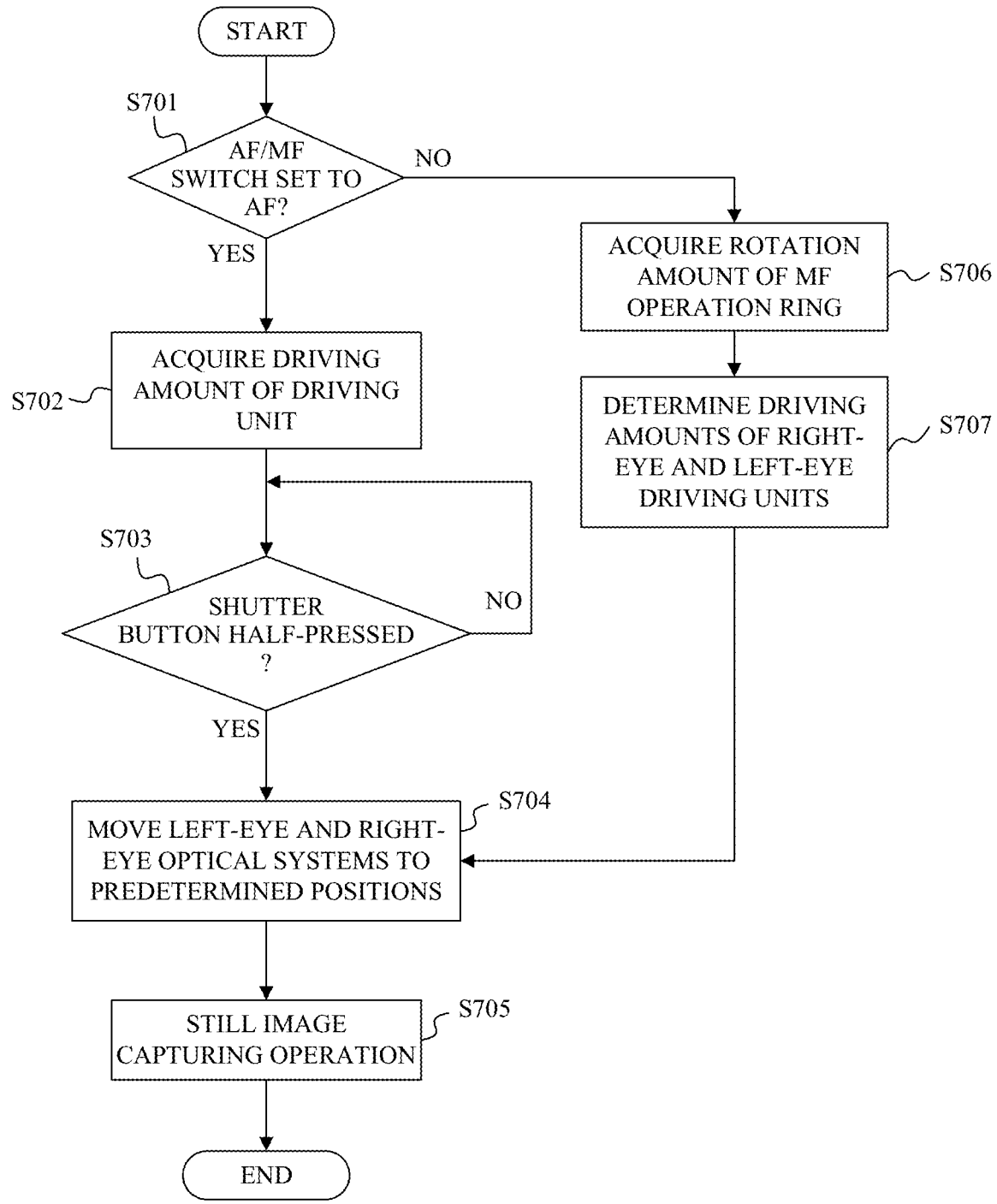
FIG. 24 is a flowchart illustrating processing in determining motion of a focus lens according to Example 7.

FIG. 24 is a flowchart illustrating processing in determining motion of the focus lens by the body system control unit 118 and the lens system control unit 209 according to this example. The flow in FIG. 24 starts when the camera system 100 is powered on. The photographer needs to confirm a focus difference between left and right images before starting photography. In a case where there is no focus difference, imaging can be continued as it is, but in a case where there is a focus difference, the photographer needs to adjust the right-eye optical system focusing unit 510 to eliminate the focus difference.

In step S701, the lens system control unit 209 determines whether the AF/MF switch 700 is set to "AF." In a case where it is determined that the AF/MF switch 700 is set to "AF," the processing of step S702 is executed, and in a case where it is determined that the AF/MF switch 700 is not set to "AF," that is, the AF/MF switch 700 is set to "MF," the processing of step S706 is executed.

Steps S702 to S707 correspond to steps S404 to S409 in FIG. 16, respectively, so a description thereof will be omitted.

The configuration according to this example enables the photographer to switch between AF mode and MF mode with a simple operation. Even if the left-eye and right-eye optical systems are mounted, this example can easily perform focusing of the left-eye and right-eye optical systems by rotating the MF operation ring 601. Since the photographer manually performs focusing of the right-eye optical system 201R, the number of components of the interchangeable lens 200 can be reduced.

In this example, the AF detector 117 determines a driving amount of the driving unit 400 using the AF detection result of a left-eye image. As long as a focus difference between left and right images is previously eliminated, the AF detector 117 may use any part of the captured image for detection.

Example 8

A camera system 100 according to this example is different from the camera system 100 according to Example 1 in the configuration of the interchangeable lens 200. The configuration of the camera body 110 is similar to that of Example 1. This example will discuss configurations different from those of Example 1, and will omit a description of common configurations.

The interchangeable lens 200 according to this example has an external configuration similar to that of the interchangeable lens 200 according to Example 1 described with reference to FIG. 5.

Figure 25:
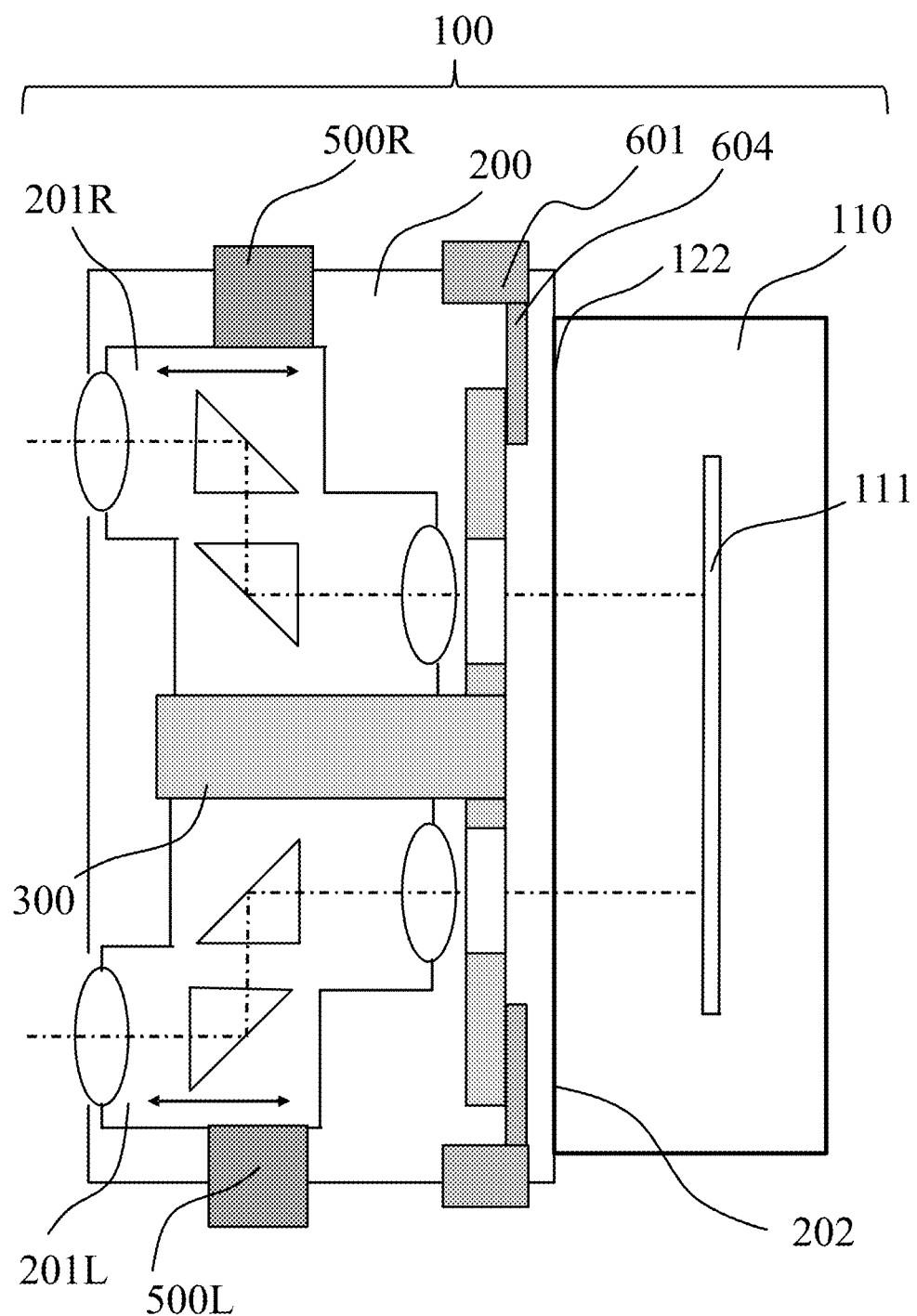
FIG. 25 is a schematic configuration diagram of an camera system according to Example 8.

FIG. 25 is an electrical block diagram of the camera system 100 according to this example. Each of the left-eye and right-eye optical systems is supported by the lens base 300 so as to be movable relative to the lens base 300 in the direction orthogonal to the imaging surface of the image sensor 111. A right-eye driving unit 500R and a left-eye driving unit 500L for moving relative to the lens base 300 are attached to the right-eye and left-eye optical systems, respectively. Due to this configuration, the left-eye and right-eye optical systems can move relative to each other in the direction orthogonal to the imaging surface of the image sensor 111.

The left-eye and right-eye optical systems can perform focusing by moving the entire optical system using the right-eye driving unit 500R and the left-eye driving unit 500L, respectively. The MF operation ring 601 and the cam ring 604 are integrally formed, and the cam ring 604 is mechanically connected to the lens base 300. Although the cam ring 604 is not illustrated, the surface of the cam ring is tapered, and rotation of the cam ring 604 allows the lens base 300 to move in the optical axis direction.

Figure 26:
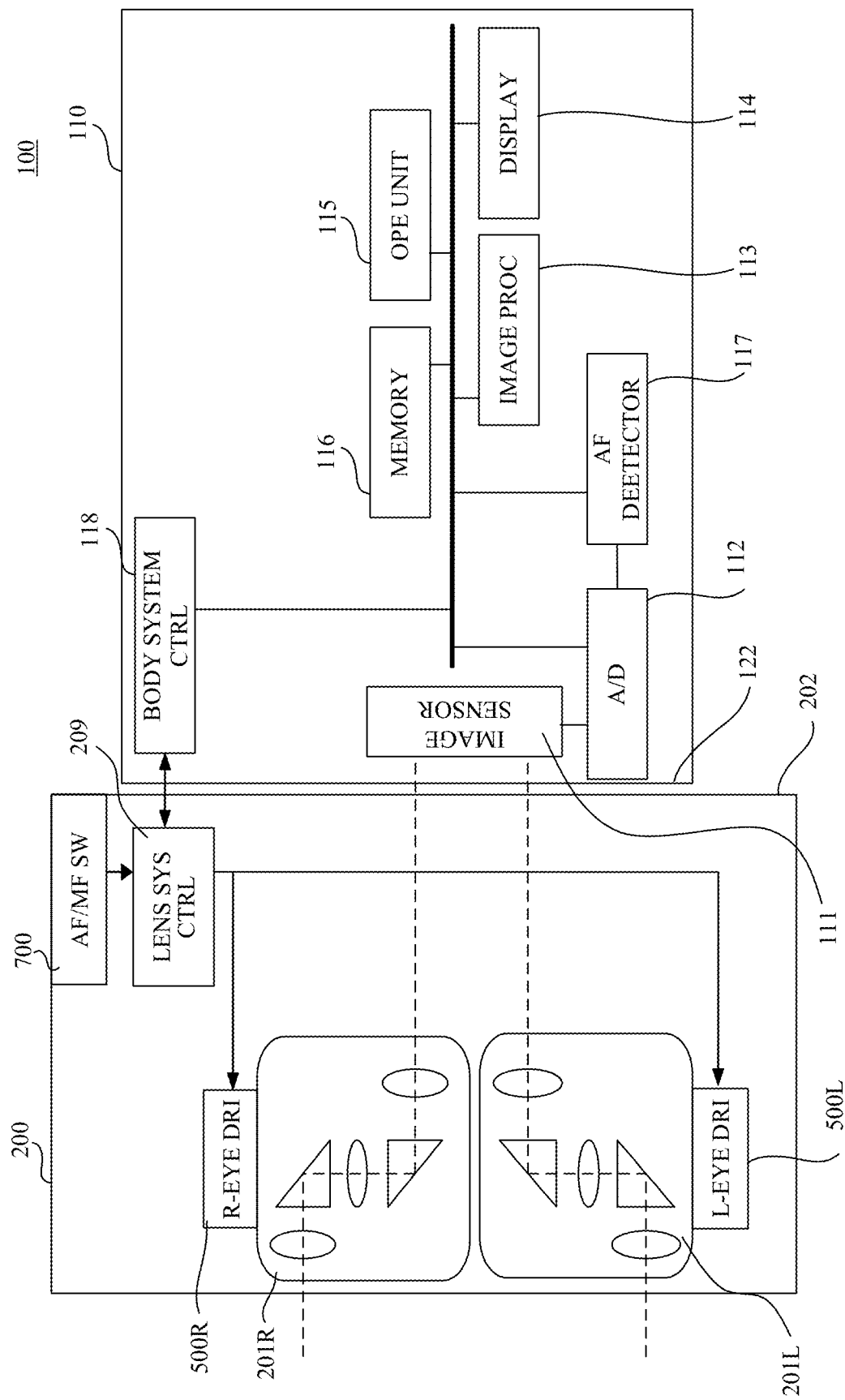
FIG. 26 is an electrical block diagram of the camera system according to Example 8.

FIG. 26 is an electrical block diagram of the camera system 100 according to this example. The basic configuration of the camera system 100 is the same as that of Example 1. Since the lens base 300 is mechanically movable according to the rotation of the MF operation ring 601, the interchangeable lens 200 has no encoder 602 for detecting the rotation of the MF operation ring 601. In this example, AF operates in a case where the AF/MF switch 700 is set to "AF," but AF stops operating in a case where it is set to "MF."

Figure 27:
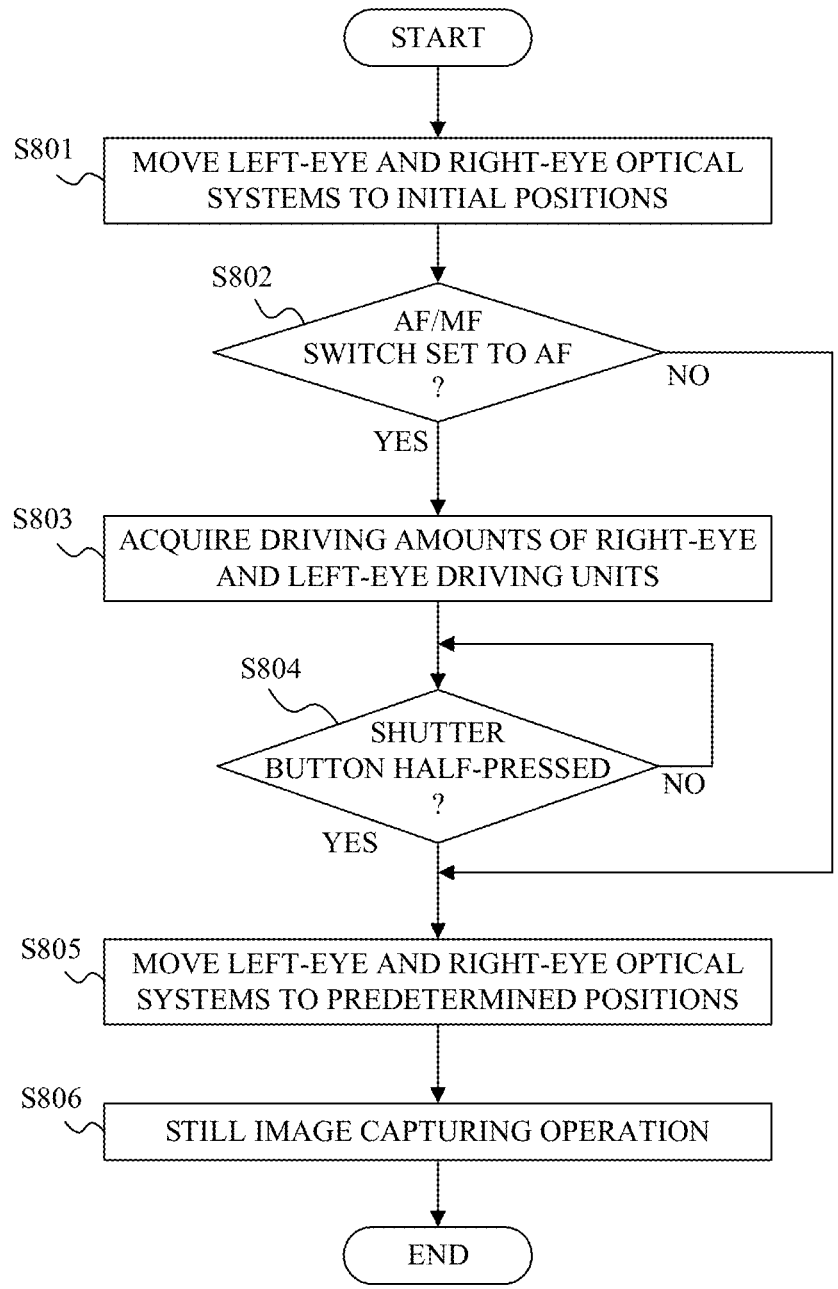
FIG. 27 is a flowchart illustrating processing in determining motion of a focus lens according to Example 8.

FIG. 27 is a flowchart illustrating processing in determining motion of the focus lens by the body system control unit 118 and the lens system control unit 209 according to this example. The flow of FIG. 27 is started when the camera system 100 is powered on.

Steps S801 to S804 and step S806 correspond to steps S101 to S104 and step S106 in FIG. 7, respectively, so a description thereof will be omitted.

In step S805, the lens system control unit 209 drives the right-eye driving unit 500R and the left-eye driving unit 500L by the driving amount of the lens base 300 acquired in step S103 or according to rotation of the MF operation ring 601, and moves the left-eye and right-eye optical systems to predetermined positions.

In this example, in a case where it is determined that the AF/MF switch 700 is set to "MF," the AF stops operating, and the lens base 300 is mechanically moved by the MF operation ring 601 rotated by the photographer.

The configuration according to this example enables the photographer to switch between the AF mode and the MF mode with a simple operation, and even if the left-eye and right-eye optical systems are mounted, this example can easily adjust a focus difference between left and right images by rotating the MF operation ring 601.

In this example, the AF stops operating in a case where the AF/MF switch 700 is set to "MF," but the MF operation ring 601, the cam ring 604, and the lens base 300 may be disconnected and the MF operation may be prohibited from operating in a case where the AF/MF switch 700 is set to "AF." Alternatively, the AF/MF switch 700 may not be provided, and fine adjustment may be mechanically performed in MF during AF.

In this example, the right-eye driving unit 500R and the left-eye driving unit 500L move the right-eye and left-eye optical systems, respectively, but the present disclosure is not limited to this example. The right-eye driving unit 500R may be provided to eliminate a focus difference between left and right images as in Examples 4 to 6, and the lens base 300 may be mechanically moved by the MF operation ring 601 and the cam ring 604 instead of the driving unit 400. In this configuration, only the right-eye driving unit 500R is a switching target between AF and MF.

Example 9

The camera system 100 according to this example is different from the camera system 100 according to Example 5 in the configuration of the interchangeable lens 200. The configuration of the camera body 110 is similar to that of Example 4. This example will discuss configurations different from those of Example 5, and will omit a description of common configurations.

Figure 28:
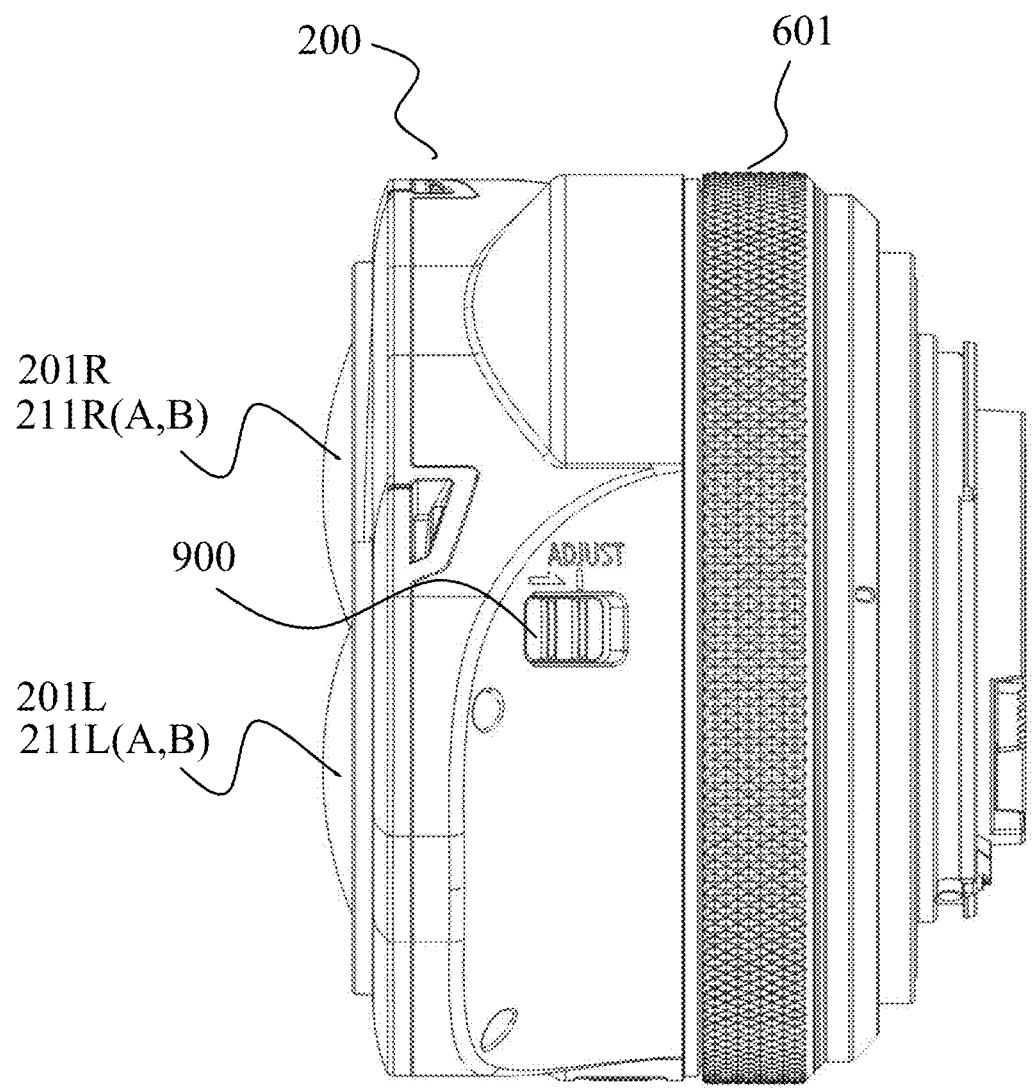
FIG. 28 is a side view of an interchangeable lens according to Example 9.

FIG. 28 is a side view of the interchangeable lens 200 according to this example. In this example, the interchangeable lens 200 includes a switch 900. The switch 900 is disposed on the left side of the lens mount unit 202 and is a slide switch.

The photographer can select which of the right-eye optical system 201R and the lens base 300 to move using the switch 900 in this example. In a case where the switch 900 is set in a direction opposite to an arrow direction in FIG. 28, the lens base 300 moves to set a mode (referred to as a first mode hereinafter) for moving the left-eye and right-eye optical systems in the optical axis directions.

In a case where the switch 900 is slid in the direction of the lens mount unit 202 (in the arrow direction in FIG. 28), the right-eye optical system 201R is moved relative to the lens base 300 to set a mode (referred to as a second mode hereinafter) for adjusting relative focal positions of the left-eye and right-eye optical systems.

Figure 29:
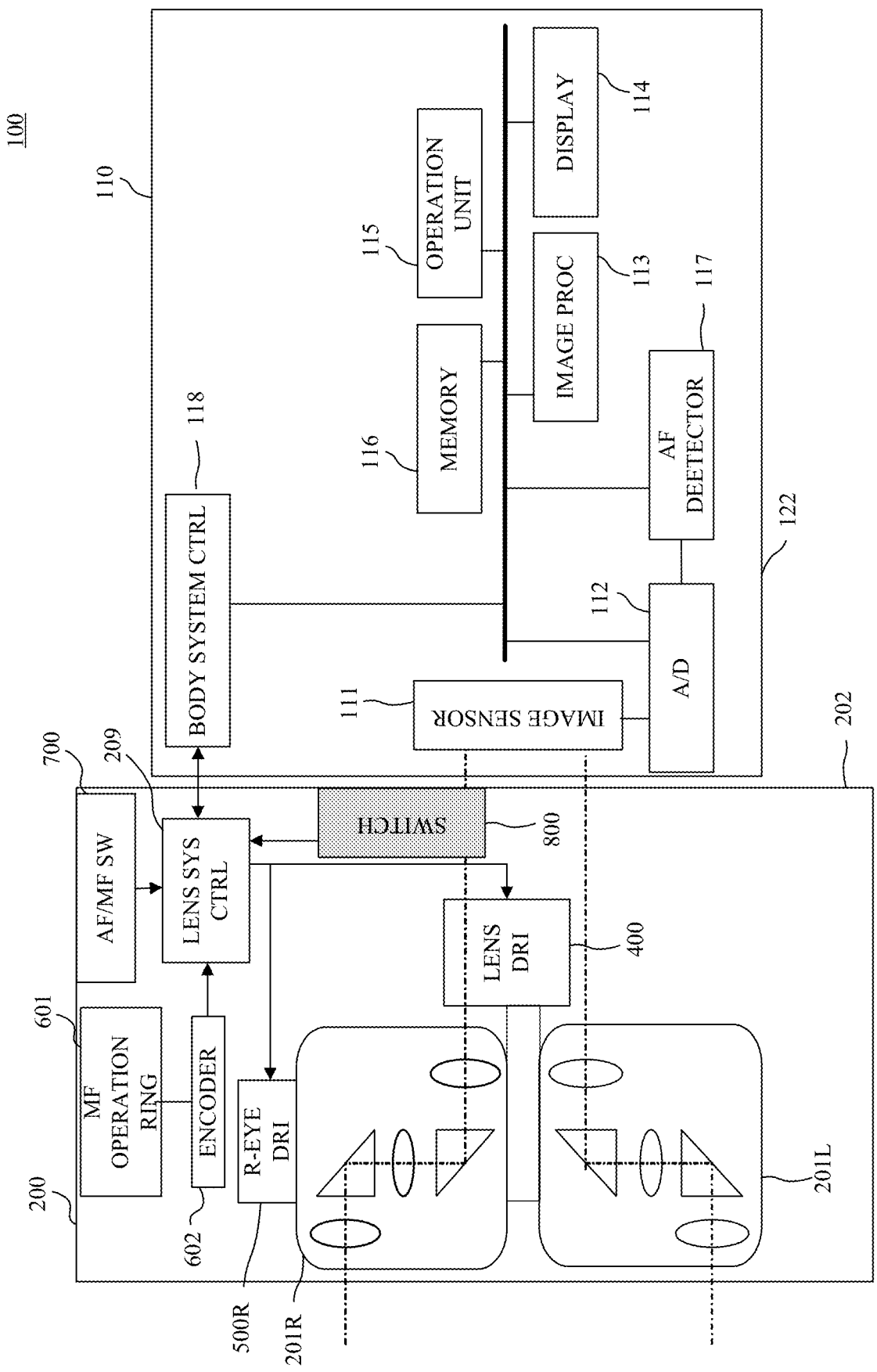
FIG. 29 is an electrical block diagram of a camera system according to Example 9.

FIG. 29 is an electrical block diagram of the camera system 100 according to this example. The basic configuration of the camera system 100 is similar to that of Example 4, but the interchangeable lens 200 further includes the switch 900. The lens system control unit 209 determines the position of the switch 900, selects the right-eye optical system 201R or the lens base 300, and moves the selected member according to rotation of the MF operation ring 601.

The basic flow of processing in determining motion of the focus lens by the body system control unit 118 and the lens system control unit 209 according to this example is the same as that of Example 5, and thus a description thereof will be omitted. The basic configuration of the camera system 100 is similar to that of Example 5, but no button 800 is mounted and the switch 900 is mounted.

The configuration according to this example enables the photographer to select the member to be moved by simply sliding the switch 900. In a case where there is a focus difference between left and right images, the photographer selects the right-eye optical system 201R to eliminate the focus difference between the left and right images. In a case where there is no focus difference between left and right images, the photographer can easily perform left and right focusing by selecting the lens base 300 and rotating the MF operation ring 601.

In the second mode, among captured images displayed on the display unit 114 of the camera body 110, a captured image formed via the right-eye optical system 201R is enlarged and displayed. This configuration can improve the efficiency of delicate adjustment work for adjusting a focus difference between left and right images.

In a case where the second mode is selected using the switch 900, the display unit 114 of the camera body 110 may display the second mode. In a case where the second mode is selected, the setting may be such that the photographer cannot perform the imaging operation. Due to this setting, the photographer can recognize the second mode.

An operation of driving the right-eye optical system 201R to a predetermined position (referred to as a reset operation hereinafter) may be performed each time the second mode is selected. Once the second mode is selected and a focus difference between left and right images is adjusted, basically focuses of left and right images will not shift from the adjusted positions. However, after a focus difference between left and right images is adjusted, a focus difference between left and right images may occur due to an external impact or the like. In a case where the photographer notices a focus difference, the photographer selects the second mode using the switch 900. At this time, the reset operation that returns the right-eye optical system 201R to the initial position reduces a focus shift amount between left and right images, and the burden of focusing on the photographer.

The right-eye optical system 201R may be moved to the position where the relative focal positions of the left-eye and right-eye optical systems were adjusted last time.

The camera body 110 may have a menu that allows the settings to be returned to the shipping state in response to a problem unintended by the photographer.

In this example, the switch 900 switches between the first mode and the second mode, but the menu screen of the camera body 110 may switch between them. This configuration enables the photographer to operate the switch 900 or the menu screen in an easy-to-operate manner.

The configuration of the camera body 110 may be similar to that of Example 2. That is, the left-eye and right-eye optical systems may be moved in a case where the first mode is selected using the switch 900, and the right-eye optical system 201R may be moved in a case where the second mode is selected using the switch 900. That is, the photographer can easily select, using the switch 900, whether to perform the focusing operation of the left-eye and right-eye optical systems or to adjust a focus difference between left and right images.

A driving amount of the driving unit due to the rotation of the MF operation ring 601 (a driving amount of the driving unit corresponding to the unit operation of the MF operation ring 601) may be changed between the first mode and the second mode. Due to this configuration, for example, in a case where the right-eye optical system 201R is selected, by reducing a driving amount per rotation of the MF operation ring 601 (by increasing the resolution), the photographer can improve the efficiency of delicate adjustment work for adjusting a focus difference between left and right images.

This example may provide a tactile feedback device such as haptics technology inside the MF operation ring 601 to change an operation sense depending on the selected member. This configuration enables the photographer to easily determine which member is selected.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments.

The present disclosure can provide a lens apparatus that has an autofocus mode and a manual focus mode, and can perform focusing of two optical systems individually (exclusively) and with high accuracy.

This embodiment uses a rotatable ring member for the MF operation, but may use a non-rotatable member such as a button member. For example, the button member may operate one of the left-eye and right-eye optical systems, and the ring member may operate the other of the left-eye and right-eye optical systems.

This application claims the benefit of Japanese Patent Applications Nos. 2022-157346, filed on Sep. 30, 2022, and 2023-090563, filed on May 31, 2023, each of which is hereby incorporated by reference herein in their entirety.

What is claimed is:

1. A lens apparatus configured to be attachable to and detachable from an image pickup apparatus, the lens apparatus comprising:
    a first optical system and a second optical system;
    a driver configured to move at least one of the first optical system and the second optical system in an optical axis direction of the at least one of the first optical system and the second optical system;
    an operation member configured to move the at least one of the first optical system and the second optical system in the optical axis direction via the driver; and
    a selector configured to select an optical system to be moved based on an operation on the operation member, wherein the driver moves the at least one of the first optical system and the second optical system in the optical axis direction based on the operation on the operation member, and wherein the lens apparatus is configured to switch between a first driving mode for performing autofocus by moving both the first optical system and the second optical system in the optical axis directions of the first optical system and the second optical system via the driver, and a second driving mode for adjusting a difference in imaging position for a same object image between the first optical system and the second optical system by moving the at least one of the first optical system and the second optical system in the optical axis direction of the at least one of the first optical system and the second optical system via the driver.

2. The lens apparatus according to claim 1, wherein the lens apparatus is configured to switch between an autofocus mode for performing focusing of the first optical system and the second optical system based on object information, and a manual focus mode for performing focusing based on an operation on the operation member.

3. The lens apparatus according to claim 1, wherein an operation sense for the operation member changes according to a selection result of the selector.

4. The lens apparatus according to claim 1, wherein the operation member includes:
   a first operation member configured to move the first optical system in the optical axis direction of the first optical system; and
   a second operation member configured to move the second optical system in the optical axis direction of the second optical system.

5. The lens apparatus according to claim 4, wherein the first operation member and the second operation member are disposed along optical axes of the lens apparatus.

6. The lens apparatus according to claim 4, wherein one of the first operation member and the second operation member is rotatable, and the other of the first operation member and the second operation member is not rotatable.

7. The lens apparatus according to claim 1, wherein the operation member includes:
   a first operation member configured to move the first optical system in the optical axis direction of the first optical system; and
   a second operation member configured to move the second optical system in the optical axis direction of the second optical system,
   wherein a driving amount of the driver corresponding to a unit operation on the operation member in a case where the selector selects the first optical system is smaller than in a case where the selector selects the second optical system.

8. The lens apparatus according to claim 1, further comprising a switching unit configured to switch between the first driving mode and the second driving mode.

9. The lens apparatus according to claim 8, further comprising a position detector configured to detect a position of the first optical system,
   wherein in a case where the first driving mode is switched to the second driving mode, the driver drives the first optical system to a predetermined position.

10. The lens apparatus according to claim 1, wherein the driver drives each of the first optical system and the second optical system exclusively.

11. The lens apparatus according to claim 1, wherein the driver is driven based on a focus difference between a first image formed via the first optical system and a second image formed via the second optical system.

12. The lens apparatus according to claim 1, wherein the operation member is mechanically connected to the first optical system and the second optical system, and
   wherein the first optical system and the second optical system move according to the operation on the operation member.

13. The lens apparatus according to claim 1, wherein the first optical system and the second optical system are equivalent optical systems.

14. The lens apparatus according to claim 1, further comprising a switching member configured to switch between an autofocus mode and a manual focus mode.

15. The image pickup apparatus according to claim 14, wherein the image pickup apparatus includes a single image sensor.

16. The image pickup apparatus according to claim 14, wherein the image pickup apparatus performs the autofocus using digital signals of object images formed by the first optical system and the second optical system.

17. The image pickup apparatus according to claim 14, wherein the image pickup apparatus has a switching menu for switching between the first driving mode and the second driving mode.

18. The image pickup apparatus according to claim 14, further comprising a display configured to display a first image formed via the first optical system and a second image formed via the second optical system,
   wherein in the second driving mode, the display enlarges and displays an image formed through one of the first optical system and the second optical system to be driven to adjust a focus difference between the first optical system and the second optical system.

19. An image pickup apparatus comprising:
   the lens apparatus according to claim 1; and
   an image sensor.

* * * * *